US010838957B2

(12) United States Patent
Bruno et al.

(10) Patent No.: US 10,838,957 B2
(45) Date of Patent: Nov. 17, 2020

(54) SLICING RELATIONAL QUERIES USING SPOOL OPERATORS

(75) Inventors: Nicolas Bruno, Redmond, WA (US); Ravishankar Ramamurthy, Redmond, WA (US); Surajit Chaudhuri, Redmond, WA (US); Vivek Ravindranath Narasayya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1161 days.

(21) Appl. No.: 12/817,511

(22) Filed: Jun. 17, 2010

(65) Prior Publication Data

US 2011/0313999 A1 Dec. 22, 2011

(51) Int. Cl.
*G06F 16/2453* (2019.01)
(52) U.S. Cl.
CPC .. *G06F 16/24537* (2019.01); *G06F 16/24542* (2019.01)
(58) Field of Classification Search
CPC ......... G06F 17/30477; G06F 17/30548; G06F 17/30545; G06F 17/30427; G06F 17/30442; G06F 2206/1504; G06F 17/30463; G06F 17/30469; G06F 17/3053; G06F 16/24537; Y10S 707/954; Y10S 707/99933
USPC ....... 707/708, 713, 718, 719, 721, 759–770, 707/705, 717
See application file for complete search history.

(56) References Cited

U.S. PATENT DOCUMENTS

| 4,769,772 | A | 9/1988 | Dwyer |
| 5,590,319 | A | 12/1996 | Cohen et al. |
| 6,289,334 | B1 | 9/2001 | Reiner et al. |
| 6,792,420 | B2 | 9/2004 | Chen et al. |
| 7,574,424 | B2 | 8/2009 | Chowdhuri |
| 7,672,926 | B2 * | 3/2010 | Ghazal et al. ......... 707/999.002 |

(Continued)

OTHER PUBLICATIONS

Gardarin et al. "Caliberating the Query Optimizer Cost Model of IRO-DB, an Object-Oriented Federated Database System" Proceedings of the 22 nd VLDB Conference Mumbai (Bombay), India 1996.*

(Continued)

*Primary Examiner* — Tamara T Kyle
*Assistant Examiner* — Berhanu Mitiku
(74) *Attorney, Agent, or Firm* — Alleman Hall Creasman & Tuttle LLP

(57) ABSTRACT

A relational database server may concurrently execute many relational queries, but a complex relational query may cause performance delays in the fulfillment of other relational queries. Instead, the relational database server may generate a query plan for the relational query, and may endeavor to partition the relational query between a spool operator and a scan operator into two or more query slices, where each query slice may be executed within a query slice threshold. Many alternative candidate query plans may be considered, such as inserting spool and scan operators after various operators and parameterizing operators in order to partition the records of a relation into two or more ranges based on an attribute of the relation. A large search space of candidate query plans may be reviewed in order to select a query plan that respects the query slice threshold while efficiently executing the logic of the relational query.

20 Claims, 15 Drawing Sheets

(56) References Cited

U.S. PATENT DOCUMENTS

| | | | |
|---|---|---|---|
| 8,046,768 B2* | 10/2011 | Smith et al. | 718/104 |
| 2004/0220923 A1 | 11/2004 | Nica | |
| 2006/0218123 A1* | 9/2006 | Chowdhuri et al. | 707/2 |
| 2007/0250473 A1* | 10/2007 | Larson et al. | 707/2 |
| 2009/0106219 A1* | 4/2009 | Belknap | G06F 16/24545 |
| 2009/0271385 A1* | 10/2009 | Krishnamoorthy | G06F 16/24532 |

OTHER PUBLICATIONS

Zhu et al. "Solving Local Cost Estimation Problem for Global Query Optimization in Multidatabase System" Distributed and Parallel Databases, 6, 373-421 (1998) 1998 Kluwer Academic Publishers, Boston. Manufactured in The Netherlands.*

Cheng et al. "Locking Mechanism for Controlling Access to Data Base Resources" an I P.com Prior Art Database Technical Disclosure Original Publication Date: Aug. 1, 1986.*

Zhu et al. "Solving Local Cost Estimation Problem for Global Query Optimization in Multidabase Systems" Department of Computer Information Science the University of Michigan, Dearborn, MI 48128 (Year: 1998).*

Cheng et al. "Locking Mechanism for Controlling Access to Data Base Resources".IP.com Electronic Publication: Mar. 9, 2005 (Year: 2005).*

Jurczyk; et al., "Dynamic Query Processing for P2P Data Services in the Cloud"—Published Date: 2009, pp. 396-411, http://www.mathcs.emory.edu/~lxiong/research/pub/dobjects09dexa.pdf.

He; et al., "Wave Computing in the Cloud"—Published Date: 2009 http://research.microsoft.com/pubs/80521/hotos_wave.pdf.

Andrade; et al., "Active Proxy-G: Optimizing the Query Execution Process in the Grid"—Published Date: Nov. 2002, http://acm.supercomputing.org/sc2002/paperpdfs/pap.pap219.pdf.

Borzsonyi; et al., "The Skyline Operator"—Retrieved: Jan. 29, 2010, http://www.dbis.ethz.ch/research/publications/38.pdf.

Chandramouli; et al., "Query Suspend and Resume", Jun. 11-14, 2007, http://www.cs.duke.edu/dbgroup/papers/2007-SIGMOD-cbby-qresume.pdf.

Chang; et al., "Bigtable: A Distributed Storage System for Structured Data", 2006, https:..labs.google.com/papers/bigtable-osdi06.pdf.

Chaudhuri; et al., "Stop and Restart Style Execution for Long Running Decision Support Queries", Sep. 23-28, 2007, pp. 735-745, http://www.vldb.org/conf/2007/papers/research/p735-chaudhuri.pdf.

Chaudhuri; et al., "Automating Statistics Management for Query Optimizers",—Retrieved: Jan. 29, 2010, ftp://ftp.research.microsoft.com/users/autoadmin/stats.pdf.

Dewitt; et al., "Parallel Database Systems: The Future of High Performance Database Processing", Jan. 1992, http://eprints.kfupm.edu.sa/56817/1/56817.pdf.

Ganguly; et al., "Query Optimization for Parallel Execution", 1992, http://www3.in.tum.de/teaching/WS_2004-2005/VWDB_WS0405A/VDBMS/Literatur/Ganguly92.pdf.

Hasan; et al., "Coloring Away Communication in Parallel Query Optimization", 1995, pp. 329-350 http://www.vldb.org/conf/1995/P239.PDF.

Krompass; et al., "Dynamic Workload Management for Very Large Data Warehouses: Juggling Feathers and Bowling Balls", Sep. 23-28, 2007, pp. 1105-1115, http://www.vldb2007.org/program/papers/industrial/p1105-krompass.pdf.

Krompass; et al., "Managing Long Running Queries", Mar. 24-26, 2009, http://www.edbt.org/Proceedings/2009-StPetersburg/edbt/papers/p0132-Krompa%C3%9F.pdf.

Ross; et al., "Optimal Splitters for Database Partitioning with Size Bounds"—Retrieved: Jan. 29, 2010, http://app.cul.columbia.edu:8080/ac/bitstream/10022/AC:P:29549/1/508.pdf.

Selinger; et al., "Access Path Selection in a Relational Database Management System", 1979, http://infolab.stanford.edu/~widom/cs346/selinger.pdf.

Weissman; et al., "The Design of the Force.com MultiTenant Internet Application Development Platform", Jun. 29-Jul. 2, 2009, pp. 889-896, http://delivery.acm.org/10.1145/1560000/1559942/p889-weissman.pdf?key1=1559942&key2=2681905621&coll=GUIDE&dl=GUIDE&CFID=76009486&CFTOKEN=36677577.

Yan; et al., "Eager Aggregation and Lazy Aggregation", 1995, http://www.sigmod.org/vldb/conf/1995/P345.PDF.

* cited by examiner

160

```
    // SelectPlan version 1 function UpdateMemo (R: relation set, SO: sort order, P: plan)
        // records the plan P for the relation set R with sort order SO if it's the
        // lowest cost solution found so far for this R and SO 01      if (P ≠ null and (Memo[R, SO] = null or cost(P) < cost(Memo[R, SO])))
02          Memo[R, SO] = P function SelectPlan (R: relation set, SO: sort order)
        // returns the lowest-cost plan for relation set R satisfying SO 01      if (Memo[R, SO] was not yet calculated)
02          if (SO ≠ null)       // try sorting with a separate operator
03              CP = Sort(SelectPlan(R, null), SO)
04              UpdateMemo(R, SO, CP)
05          if (|R|) = 1
06              CP = best single-table plan under SO
07              UpdateMemo(R, SO, CP)
08          else for each valid partition (R1, R2) of R
09              for each join algorithm JA
10                  SO1, SO2 = required orders of R1, R2 for JA
11                  CP1 = SelectPlan(R1, SO1)
12                  CP2 = SelectPlan(R2, SO2)
13                  if (CP1 ≠ null and CP2 ≠ null)
14                      CP = JA(CP1, CP2)
15                      UpdateMemo(R, SO, CP)
16      return Memo[R, SO]
```

```
// SelectPlan version 2 function UpdateMemo (R: relation set, SO: sort order, P: plan)
    // records the plan P for the relation set R with sort order SO in the skyline
    // of solutions for this R and SO 01  if (P ≠ null and ( ∀ p ∈ P: SC(p) ≤ Δ))
02      Memo[R, SO] = skyline(Memo[R, SO] ∪ P)

function SelectPlan (R: relation set, SO: sort order)
    // returns the lowest-cost plan for relation set R satisfying SO 01  if (Memo[R, SO] was not yet calculated)
02      if (SO ≠ null)        // try sorting with a separate operator
03          for each (CP ∈ SelectPlan(R, null))
04              UpdateMemo(R, SO, Sort(CP, SO))
05              UpdateMemo(R, SO, Scan(Spool(Sort(CP, SO))))
06      if (|R|) = 1
07          CP = best single-table plan under SO
08          UpdateMemo(R, SO, CP)
09          UpdateMemo(R, SO, Scan(Spool(CP)))
10      else for each valid partition (R1, R2) of R
11          for each join algorithm JA
12              SO1, SO2 = required orders of R1, R2 for JA
13              CP1 = SelectPlan(R1, SO1)
14              CP2 = SelectPlan(R2, SO2)
15              for each (pCP1, pCP2) ∈ CP1 × CP2
16                  CP = JA(pCP1, pCP2)
17                  UpdateMemo(R, SO, CP)
18                  UpdateMemo(R, SO, Scan(Spool(CP)))
19  return Memo[R, SO]
```

FIG. 10

```
180
    function SelectRanges (P: parametric plan)
01      RS = ∅
02      L = -∞; H = +∞
03      while (L < H)
04          rMin = L; rMax = H
05          fMin = SC(P[L, rMin]); fMax = SC(P[L, rMax])
06          while (rMax − rMin > ε)
07              rMid = (rMin + rMax) / 2
08              fMid = SC(P[L, rMid])
09              if (fMid > Δ) rMax = rMid
10              else rMin = rMid
11          RS = RS ∪ [L, rMid]
12          L = rMid
13      return RS
```
FIG. 11
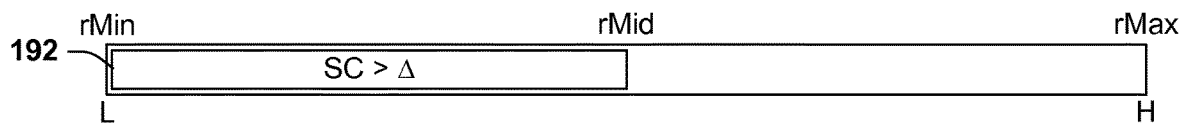
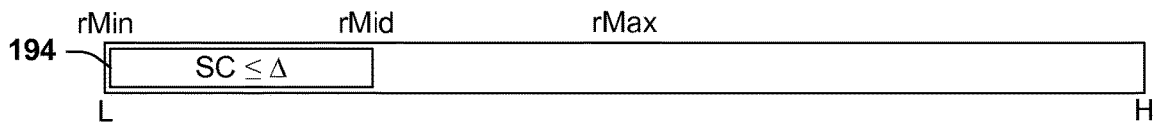
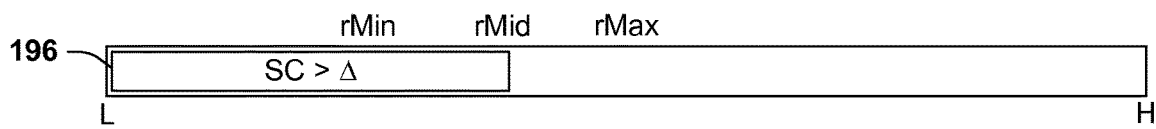
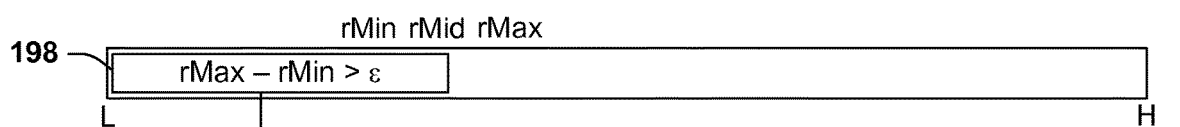
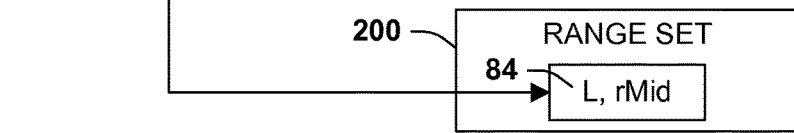
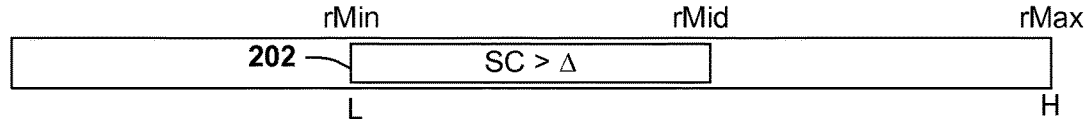
FIG. 12

210

```
// SelectPlan version 3 function UpdateMemo (R: relation set, SO: sort order, P: plan)
    // records the plan P for the relation set R with sort order SO in the skyline
    // of solutions for this R and SO 01      if (P ≠ null and ( ∀ p ∈ P: SC(p) ≤ Δ))
02          Memo[R, SO] = skyline(Memo[R, SO] ∪ P)

function SelectPlan (R: relation set, SO: sort order)
    // returns the lowest-cost plan for relation set R satisfying SO 01      if (Memo[R, SO] was not yet calculated)
02          if (SO ≠ null)      // try sorting with a separate operator
03              for each (CP ∈ SelectPlan(R, null))
04              UpdateMemo(R, SO, Sort(CP, SO))
05              UpdateMemo(R, SO, Scan(Spool(Sort(CP, SO))))
06          if (|R|) = 1
07              CP = best single-table plan under SO
08              UpdateMemo(R, SO, CP)
09              UpdateMemo(R, SO, Scan(Spool(CP)))
10          else for each valid partition (R1, R2) of R
11              for each join algorithm JA
12                  SO1, SO2 = required orders of R1, R2 for JA
13                  CP1 = SelectPlan(R1, SO1)
14                  CP2 = SelectPlan(R2, SO2)
15                  for each (pCP1, pCP2) ∈ CP1 × CP2
16                      CP = JA(pCP1, pCP2)
17                      UpdateMemo(R, SO, CP)
18                      UpdateMemo(R, SO, Scan(Spool(CP)))
19                      if (tempScan(pCP1) and tempScan(pCP2))
20                          A = join attribute from pCP1
21                          lpCP = Scan(iSpool(A, ChangeSpools(CP, A)))
22                          SelectRanges(lpCP)
23                          UpdateMemo(R, SO, lpCP)
24      return Memo[R, SO]
```

```
// SelectPlan version 4 function ParamAttributes (P: plan)
    // returns the set of all attributes for which P is parameterized 01    ASet = parametric(P) ? { parameter(P) } : {null}
02    if (tempScan(P))
03        ASet = ASet ∪ { A in attributes(P) : (A=A') is join predicate }
04    return ASet function GenerateJoins (P1, P2: plan, JA: join algorithm)
    // tests all joins on all "interesting" attributes in P1 and P2 for low-cost plans 01    for each (A1, A2) in ParamAttributes(P1) × ParamAttributes(P2)
02        if (A1 = null or A2 = null or (A1=A2) are joined)
03            A = (A1 = null ? A2 : A1)
04            CP = JA(pCP1, pCP2)
05            UpdateMemo(R, SO, CP)
06            if (A = null)
07                pCP = Scan(Spool(CP))
08            else
09                pCP = Scan(iSpool(A, ChangeSpools(CP, A)))
10                SelectRanges(pCP)
11            UpdateMemo(R, SO, pCP)

function UpdateMemo (R: relation set, SO: sort order, P: plan)
    // records the plan P for the relation set R with sort order SO in the skyline
    // of solutions for this R and SO 01    if (P ≠ null and ( ∀ p ∈ P: ¬parametric(P) ⇒ SC(p) ≤ Δ))
02        Memo[R, SO] = skyline(Memo[R, SO] ∪ P)
```

```
    // SelectPlan version 4 (continued)

function SelectPlan (R: relation set, SO: sort order)
        // returns the lowest-cost plan for relation set R satisfying SO 01      if (Memo[R, SO] was not yet calculated)
02          if (SO ≠ null)        // try sorting with a separate operator
03              for each (CP ∈ SelectPlan(R, null))
04                  UpdateMemo(R, SO, Sort(CP, SO))
05                  UpdateMemo(R, SO, Scan(Spool(Sort(CP, SO))))
06          if (|R|) = 1
07              CP = best single-table plan under SO
08              UpdateMemo(R, SO, CP)
09              UpdateMemo(R, SO, Scan(Spool(CP)))
10              for each 'interesting' attribute A
11                  CPS = parametric plans for σ[L ≤ A < H](R) using A with SO order
12                  for each CP in CPS
13                      UpdateMemo(R, SO, CP)
14          else for each valid partition (R1, R2) of R
15              for each join algorithm JA
16                  SO1, SO2 = required orders of R1, R2 for JA
17                  CP1 = SelectPlan(R1, SO1)
18                  CP2 = SelectPlan(R2, SO2)
19                  for each (pCP1, pCP2) ∈ CP1 × CP2
20                      GenerateJoins(pCP1, pCP2, JA)
21      return Memo[R, SO]
```

```
    // SelectPlan version 5 function ValidForDeepPartition(P: plan)
        // determines whether P can participate in a deep partition of an attribute 01      return (tempScan(P) ∨ SingleTable(P) ∨ ¬parametric(P))

function GenerateJoins (P1, P2: plan, JA: join algorithm)
        // tests all joins on all "interesting" attributes in P1 and P2 for low-cost plans 01      for each (A1, A2) in paramAttributes(P1) × paramAttributes(P2)
02          if (A1 ≠ null and ¬ValidForDeepPartition(P1)) continue
03          if (A2 ≠ null and ¬ValidForDeepPartition(P2)) continue
04          if (A1 = null or A2 = null or (A1=A2) are joined)
05              A = (A1 = null ? A2 : A1)
06              CP = JA(pCP1, pCP2)
07              UpdateMemo(R, SO, CP)
08              if (A = null)
09                  pCP = Scan(Spool(CP))
10              else
11                  pCP = Scan(iSpool(C, ChangeSpools(CP, A)))
12                  TestPartitions(pCP)
13              UpdateMemo(R, SO, pCP)
```

FIG. 16

SLICING RELATIONAL QUERIES USING SPOOL OPERATORS

BACKGROUND

Within the field of computing, many scenarios involve the processing of a relational query against a relational data set, such as a relational database which comprises a set of relations, such as one or more tables that each comprises a set of attributes that define formatted fields comprising the structure of the table and a set of records having values for each of the attributes (often presented in a tabular manner, respectively, as a series of columns and rows.) The relational query specifies a set of operations to be applied against the relations, such as a selection of records matching particular criteria (e.g., having specified values for one or more attributes), a projection of selected attributes from one or more selected records from a relation, and a joining of two or more relations, wherein the records of the relations are matched in various ways (e.g., where the values of a first attribute for the records of a first relation are matched with the values of a second attribute for the records of a second relation), resulting in the generation of records having values from the combined attributes of both relations. The relational query is often specified according to a particular relational query language, such as a variant of a structured query language (SQL), and some languages may provide particular advantages, such as additional types of operators, a syntax that is easily readable and/or may be easily evaluated without ambiguity, and integration with a programming language, such as C # or Java.

Also within the field of computing, many scenarios involve a server configured to provide services on behalf of various clients. In particular, a data server may host a relational data set, such as a relational database, and may permit clients to submit queries to be executed on the relational data set and may return a result set. Such servers have become increasingly useful in several contemporary scenarios, such as cloud services that may remotely host a relational data set and the emergence of web services that may expose computing functionality to many remote clients.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In the field of hosted relational data stores, a relational data server often hosts a plurality of relational data sets, and accepts relational queries (such as SQL queries) from a large number of clients for processing against such relational data sets. Due to the logistics of server hardware (e.g., the plentiful availability and lost costs of large volumes of storage, high-performance processors, and network capacity), a relational data server may host a potentially large number of relational data sets, and may concurrently process a large number of relational queries against such relational data sets with acceptable performance, such as rapid response times for evaluating and providing results for submitted relational queries. However, this performance may be reduced by the complexity of relational data queries that, if evaluated and executed against the relational data set in an unbroken sequence, may tie up the computing resources of the server and may forestall the evaluation of other relational queries submitted by other clients. For example, if a relational query involves a join of two tables in a relational data set that each contains a million records (particularly if the attributes involved in one or both tables are not indexed), the relational query may take a long time to evaluate. The protracted commitment of a processor, memory, a communications bus connecting the data stores where the tables are stored, and network bandwidth may cause unacceptable delays in the processing of other relational queries submitted by other users.

In order to address this problem, some relational data servers are configured to, upon receiving a query to be executed against a relational data store, examine the relational query to estimate its complexity and the amount of computing resources that may be involved in its evaluation. If the estimated cost of evaluating the relational query exceeds an acceptable amount (such as a duration threshold), the relational data query may refuse to accept the relational query, or may defer the evaluation of the relational data query until a period of low resources utilization of the relational data server. However, this refusal or deferral may be unacceptable to the client that submitted the relational query.

Presented herein are several techniques for improving the processing of relational queries through an automated rewriting of the relational query in a manner that may permit partitioning into a set of query slices, each of which may be below a query slice threshold, such as a duration threshold. Each query slice may perform a quantum of processing of the relational query, where each query slice may persist the results of processing either to a relation in the relational data set or to a temporary relation (such as a temporary table.) Longer operations may be partitioned into iterative processes that may be achieved across several query slices. For example, a joining of two relations having a large number of records may be partitioned using a parameterized spool operator that partitions one or both relations into sets of records based on a range specified over one or more attributes, and each query slice may involve the joining of records involving one specified range. Moreover, because the partitioning of relations and the use of temporary relations increase the complexity and cost of the rewritten relational query as compared with the original relational query (thereby reducing the performance of the relational data server in completing the relational query), these techniques conservatively rewrite the relational query in order to reduce the added complexity and costs. For example, the cost of partitioning a relation into multiple sets of records increases as the number of partitions increases, so these techniques seek to identify a small number of ranges that may each be processed within the query slice threshold.

Several automated query rewriting techniques are presented herein. A first technique involves a partitioning of select-project-join ("SPJ") relational queries, which are limited to select, project, and join relational operators on various relations. A second technique extends the first technique by determining whether spooling any particular operation to a temporary relation may permit an improved partitioning. A third technique extends the second technique by testing an iterative processing of each operation by inserting parameterized spool operators around the operator, such that the operator may be performed on a set of ranges of records of the specified relations. A fourth technique extends the third technique by considering maintaining the partitioning of a relation across several operators in sequence. Additional refinements of these techniques are also presented, e.g., to limit the search space covered by the rewriting techniques by pruning unpromising considerations according to various heuristics, and identifying an advantageous set of ranges through a binary search process. These techniques may be used to configure a relational data server to accept and evaluate concurrently a large set of complex relational queries without unduly favoring any relational query or necessitating a complex manual rewriting of the relational queries.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 9 is an illustration of an embodiment of a first exemplary technique for selecting an efficient query plan for performing a relational query on a set of relations and a sort order in accordance with the techniques presented herein.

FIG. 10 is an illustration of an embodiment of a second exemplary technique for selecting an efficient query plan for performing a relational query on a set of relations and a sort order in accordance with the techniques presented herein.

FIG. 11 is an illustration of a binary search technique for selecting a set of ranges over an attribute such that each range is within a query slice threshold in accordance with the techniques presented herein.

FIG. 12 is an illustration of an exemplary scenario featuring an application of the binary search technique illustrated in FIG. 11 to select a set of ranges over an attribute.

FIG. 13 is an illustration of an embodiment of a third exemplary technique for selecting an efficient query plan for performing a relational query on a set of relations and a sort order in accordance with the techniques presented herein.

FIG. 14 is an illustration of an embodiment of a fourth exemplary technique for selecting an efficient query plan for performing a relational query on a set of relations and a sort order in accordance with the techniques presented herein.

FIG. 15 is a continued illustration of an embodiment of a fourth exemplary technique for selecting an efficient query plan for performing a relational query on a set of relations and a sort order in accordance with the techniques presented herein.

FIG. 16 is a illustration of a fifth technique for selecting an efficient query plan for performing a relational query on a set of relations and a sort order in accordance with the techniques presented herein.

DETAILED DESCRIPTION

Figure 1:
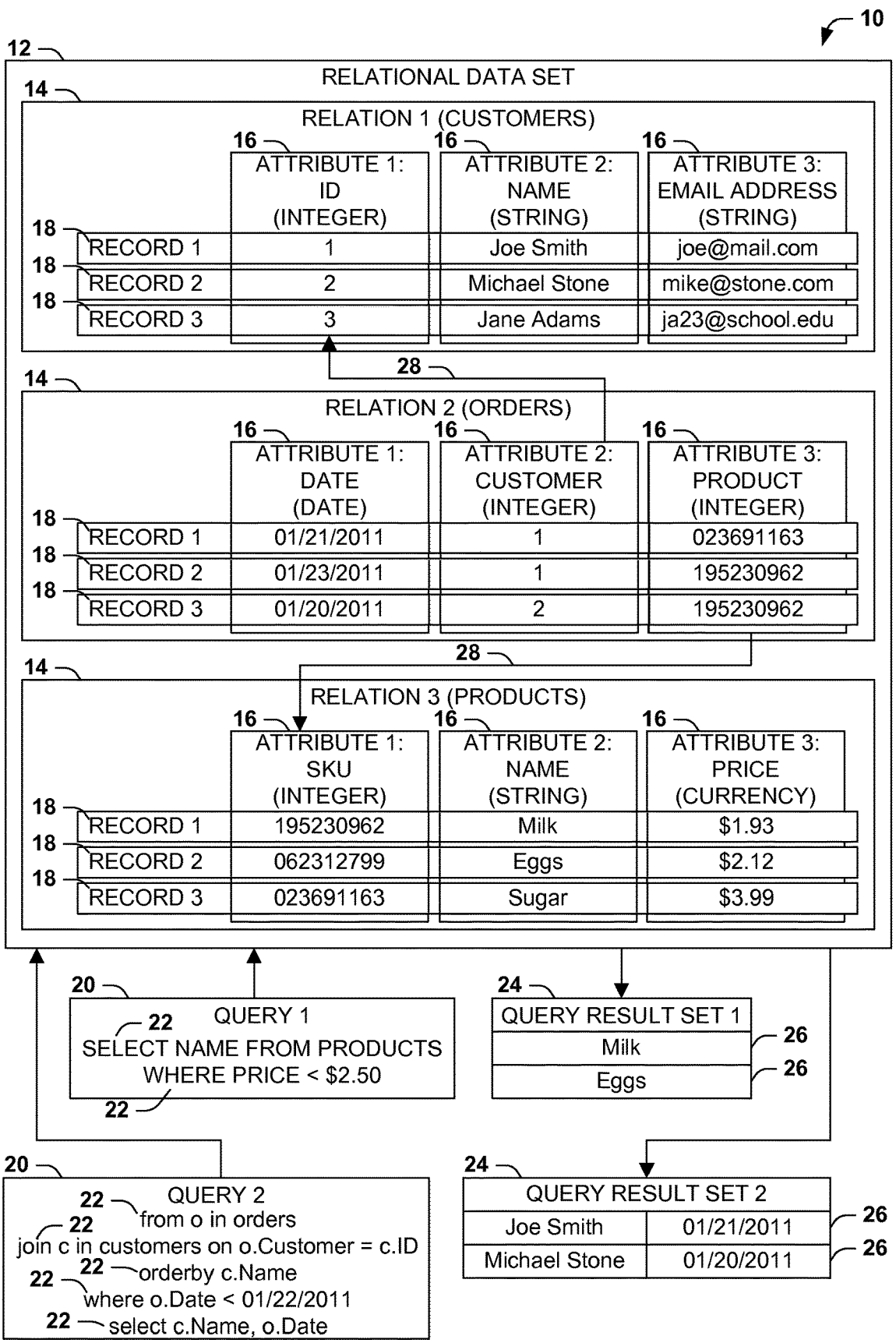
FIG. 1 is an illustration of an exemplary scenario featuring a relational data set and a set of relational queries applied thereto.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve relational data set, comprising one or more relations respectively having a set of attributes that define various aspects of the relation, and possibly a set of records having a value for each attribute of the relation. A relation is often visualized as a table having a set of columns (corresponding to attributes) that represent various fields, each having a particular semantic and constraining the valid values for the attribute with various criteria (e.g., an integer column for which only integer values may be inserted, and possibly within a defined range of integers), and a set of rows (corresponding to records) that have a value in each column satisfying the corresponding criteria. One or more attributes may also be indexed (e.g., by generating a hash table that maps a particular value for the attribute to the records that feature the value for the record) in order to facilitate rapid lookup for the records of the relation based on the attribute. Additionally, an attribute of a relation may refer to an attribute of the same or another relation (including the same attribute of the same relation) in order to represent a particular relationship between the referencing relation and the referenced relation.

Based upon the relations of a relational data set and the relationships thereamong, a relational query may be devised that performs various types of operations on the relational data set. As a first example, a relational query may select records meeting particular criteria, such as having particular values for particular attributes, and portions of various selected records in one or more relations may be joined to generate new records. As a second example, a relational query may alter the records of one or more relations, such as by inserting one or more new records into a relation with particular values for respective attributes, updating one or more records by changing the values thereof for particular attributes, and by deleting from a relation one or more records that meet specified criteria. These relational queries may be specified in various relational query languages, such as a variant of the Structured Query Language (SQL) or the Language-Integrated Query (LINQ) language, and are often structured as a combination of operators selected from a set of valid operators (such as a Select operator, a Project operator, a Join operator, an Insert operator, an Update operator, and a Delete operator.)

FIG. 1 is an illustration of an exemplary scenario 10 featuring a relational data set 12, which comprises a set of relations 14. This relational data set 12 may store data for a retail company, and may comprise a first relation 14 representing a set of products, a second relation 14 representing a set of customers who have placed orders with the retail company, and a third relation 14 representing a set of orders placed by such customers. Each relation 14 comprises a set of attributes 16 (represented as vertical columns) that define various properties of the relation 14; e.g., the first relation 14 representing customers may comprise a first attribute 16 representing a distinctive identifier for each customer, a second attribute 16 representing the name of each customer, and a third attribute 16 representing an email address for each customer. Each attribute 16 may specify a set of constraints that may be placed on the values stored therein; e.g., the "ID" attribute 16 may restrict values to positive integers, and the "email address" attribute 16 may restrict values to the domain of strings formatted according to the form "[alphanumeric characters]@[alphanumeric characters].[com|net|edu|gov]". Each relation 14 also comprises a set of zero or more records 18, each of which assigns a value to each attribute 16 of the relation 14. For example, a first record 18 in the first relation 14 may represent a customer having an ID assigned as the integer 1, a name represented as the string "Joe Smith," and an email address represented as the string "joe@mail.com". Moreover, an attribute 16 of a relation 14 may establish a relationship 28 with another attribute 16 of a relation 14 (including, e.g., an attribute 16 of another relation 14, another attribute 16 of the current relation 14, and the same attribute 16 of the current relation 14.) For example, the second relation 14, representing orders placed with the retail company, may feature a first attribute 16 representing the customer who placed the order and that may have a relationship 28 with the "ID" attribute 16 of the first relation 14, and a second attribute 16 representing a product included in the order and that may have a relationship 19 with the "SKU" attribute 16 of the third relation 14. In this manner, the data stored within a relational data set 12 may be designed to promote the validity and formatting consistency of entered data and a set of relationships among the relations 14 of the relational data set 12.

As further represented in the exemplary scenario 10 of FIG. 1, various relational queries 20 may be submitted for processing against the relational data set 12. For example, the relational data set 12 may receive a first relational query 20, specified as a Structured Query Language (SQL) query, which requests a selection of the names of products from the relational data set 12 having a "Price" attribute below $2.50. This relational query 20 may include various operators 22, such as a "SELECT" operator 22 configured to retrieve particular attributes 16 of records 18 from one or more relations 14, and a "WHERE" operator 22 configured to restrict the selection of records 18 to those having a particular value for the "Price" attribute 16 of the third relation 14. This first relational query 20 may be submitted to the relational data set 12 and processed to generate a query result set 24 including two query results 26 (e.g., the names "Milk" and "Eggs" as specified in the records 18 of the third relation 14.) A second relational query 20 may be formulated according to a Language Integrated Query (LINQ) language, and may request, based particular records 18 selected from the first relation 14 and the second relation 14, a set of synthesized records 18 comprising the customer names and order dates for any order placed before a particular date (e.g., Jan. 22, 2011), and also sorted alphabetically based on customer names. This second relational query 20 also comprises a set of operators 22, including a "join" operator 22 that combines the values in multiple records 18 and an "orderby" operator 22 that sorts query results 26 of the query result set 24 in the specified manner. This second relational query 20 may be submitted to the relational data set 12 and processed to generate a query result set 24 including two query results 26 (e.g., the name "Joe Smith" coupled with a date of Jan. 21, 2011, and the name "Michael Stone" coupled with a date of Jan. 20, 2011.) In this manner, various relational queries 20 may be submitted to the relational data set 12 for evaluation and the return of a query result set 24. Many such relational queries 20 may be devised in many relational query languages. Moreover, many details of the application of relational queries 20 may be involved (e.g., concurrent processing of many relational queries 20, stored procedures and the application of business logic, sandboxed query evaluation, exclusive resource access and transactional models, user authentication and other security issues, logging and journaling, and data backup processes.)

Relational data sets 12 are often managed by a relational database server, such as a computer having ample storage space to store a large set of relations 14 having many records 18 and complex relationships 28, and ample processing power to evaluate complex relational queries 20 applied thereto. In many scenarios, a relational database server may be connected to a network, and may be configured to receive relational queries 20 submitted by various users and applications over the network and to return query result sets 24 via the network (e.g., by serializing respective query results 26.) In some scenarios, a relational database server may be configured as a service that may be exposed to a large body of trusted and untrusted users.

In particular, a cloud relational database server may be configured to allow a user to create a user account, and, using this user account, to generate a set of private or public relational data sets 12 and to apply a set of relational queries 20 thereto. This scenario may be useful, e.g., for permitting a user to generate and access a relational data set 12 without having to acquire and configure the relational database server hardware or to perform administrative tasks such as data backup. In order to offer such services to a large body of users, an organization (such as a data services company) may acquire a large number of relational database servers and may configure these servers as a server farm, where servers may share processing work to be performed on behalf of clients, and may provide advantages such as parallel processing and mechanisms for failure recovery, such as redundancy and failover.

In scenarios such as (but not limited to) relational database server farms, the economics and logistics of contemporary computing hardware may mitigate toward sharing a particular relational database server among many users. For example, high-performance processors and abundant storage are often inexpensive, and it may be inefficient to dedicate a relational database server to the hosting of one or a few relational data sets 12 on behalf of one or a few users, where it may remain idle for long periods of time or may have a large amount of unused storage space. Rather, in many such scenarios (particularly including server farms), load balancing techniques may be utilized to achieve a mapping of relational data sets 12 and users to relational database servers that results in a high utilization of computing resources for each relational database server. Effective load balancing may result in improved efficiency as compared with ineffective load balancing, e.g., by reducing the number of relational database servers (and the ensuing hardware acquisition and maintenance expenses) that may serve a particular body of users and relational data sets 12 with adequate performance.

However, in many such scenarios (including relational database server farms), a potential problem may arise relating to the complexity of a particular relational query 20. For example, a particular relational database server may be configured to store a set of relational data sets 12 on behalf of a set of users, and may do so by receiving and applying to the relational data sets 12 a set of relational queries 20. The relational database server may have sufficient computing resources (including processor availability, system memory, persistent storage space such as in a file system, and network capacity) to evaluate many relational queries 20 concurrently with acceptable performance (such as low query processing time.) However, if a user submits a particularly complex relational query 20, the relational database server may have difficulty evaluating the relational query 20 and providing query result sets 24 in a timely manner, and without unduly delaying the concurrent processing of other relational queries 20. For example, the relational database server may concurrently process a number of relational queries 20, but the evaluation of a particular relational query 20 involves a large number (e.g., millions or billions) of records 18 in one or more relations 14; or the evaluation of the relational query 20 may be very complex (e.g., an n-way join that involves a large number of combinations of records 18); or the evaluation of the relational query 20 may result in a large number (e.g., millions or billions) of query results 26 that are to be serialized and sent over a network. In these scenarios, the evaluation of the complex relational query 20 may result in a shortage of computing resources for concurrently evaluating other relational queries 20, which may result in an unacceptable performance delay, stale search results 22, or a timeout in the processing of the other relational queries 20, or even a relational database server crash. These problems may be particularly problematic in server farm scenarios, where a processing delay or server failure caused by the evaluation of an overly complex relational query 20 may cause catastrophic failures in a large number of other relational queries 20 that are being concurrently processed on behalf of other users.

Various techniques have been devised to manage the evaluation of complex relational queries 20 in order to reduce processing delays that might impact other, concurrently processing relational queries 20. As a first example, when a relational database server receives a relational query 20, it may estimate the complexity of the relational query 20 (e.g., the number of records 20 and relations 14 involved, and the number and complexity of the operators 22 to be applied thereto) and may only accept the relational query 20 for execution if the complexity is acceptably low, and may simply reject relational queries 20 that are too complex. As a second example, the relational database server may endeavor to identify another relational database server in a server farm that may be underutilized, and that may have sufficient computing resources to evaluate the relational query 20. As a third example, the relational database server may enqueue complex relational queries 20 for evaluation at a later time when more resources may be available (e.g., outside of business hours or during a weekend or holiday.) However, for some relational queries 20, it may be difficult to estimate with sufficient accuracy the evaluation complexity. Therefore, as a fourth example, the relational database server may provisionally accept relational queries 20 for application, but may monitor the performance thereof (e.g., the number of records 20 accessed, and the amount of processing power, memory, and bandwidth utilized), and may detect when any relational queries 20 exceeds a defined limit of resource utilization. For example, the relational data set 12 may define a duration threshold (such as 100 milliseconds), and upon identifying any relational query 20 for which evaluation has not yet completed when the duration threshold has elapsed, may suspend the relational query 20 for resumption at a later time, may cancel the relational query 20 and reschedule the relational query 20 for evaluation at a later time when sufficient computing resources may be available, or may altogether terminate the relational query 20 and notify the user.

However, these techniques may be disadvantageous in some circumstances. As a first example, if a relational database server is configured to cancel and reschedule (via restarting) any relational query 20 that exceeds a duration threshold, a first relational query 20 that is close to the duration threshold may be repeatedly canceled and restarted (e.g., if, in several instances, an evaluation of a second relational query 20 causes a small processing delay in the evaluation of the first relational query 20 that exceeds the duration threshold), then the first relational query 20 may be partly evaluated and terminated several times (with the effects of the partially executed relational query 20 on the relational data set rolled back each time) before achieving a complete evaluation when computing resources are not heavily utilized, and may therefore waste significant computing resources that might be allocated to other tasks. As a second example, it may be feasible to suspend some relational queries 20 and resume them at a later time (e.g., as an iterative process), but other relational queries 20 may leave a relational data set 12 in an inconsistent state while suspended, may return incorrect or nonsensical results if the relational data set 12 changes during suspension, or may cause resource locks to persist in a manner that causes additional performance delays or deadlocks. As a third example, a relational query 20 may unavoidably involve a large number of records 18, but a relational database server, or even an entire relational database server farm, may be unable to allocate sufficient resources to achieve the complete evaluation of the relational query 20 according to the evaluation threshold policies enforced by the relational database servers. While these problems may be somewhat mitigated by requesting the user who submitted the relational query 20 to redesign the relational query 20 in a less complex manner, this request may entail a manual redesign of the relational query 20 by the user, which may be time-consuming, expensive, difficult to debug and tweak for performance improvements, and generally undesirable.

Figure 2:
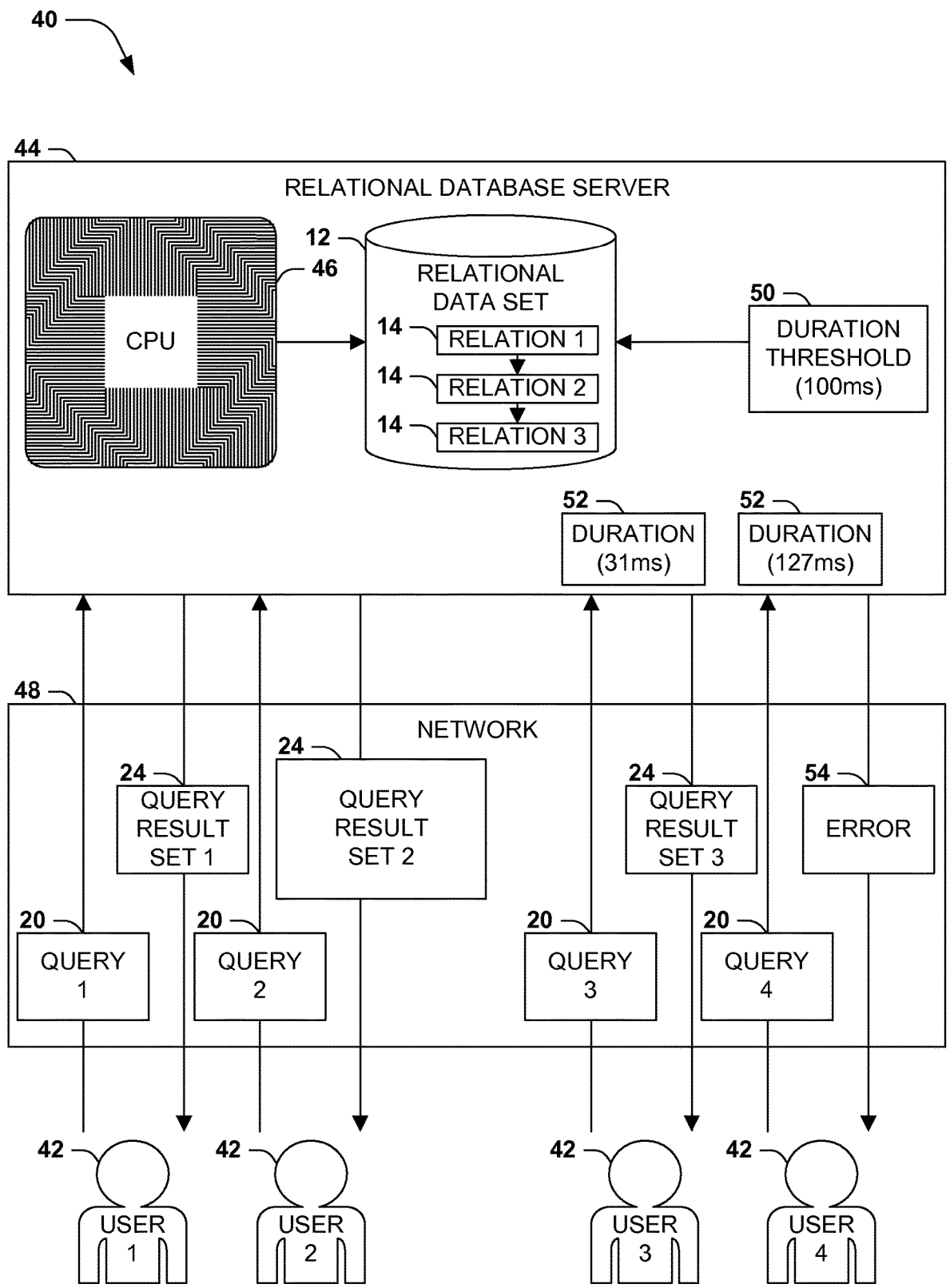
FIG. 2 is an illustration of an exemplary scenario featuring an application of queries to a relational data by a relational database server.

FIG. 2 presents an exemplary scenario 40 featuring a relational database server 44 that is configured to apply a set of relational queries 20 submitted by a set of users 42 over a network 48 to a relational data set 12 hosted therein. The relational database server 44 may include a processor 46, upon which instructions may be executed to achieve the creation and maintenance of the relational data set 12 and to evaluate and apply relational queries 20 to the relations 14 of the relational data set 12. For example, a first user 42 may submit a first relational query 20 over the network 48 to the relational database server 44, which the relational database server 44 may accept, evaluate, apply to the relational data set 12 to generate a query result set 24, and may send the query result set 24 back to the first user 42 over the network 48 (e.g., by serializing the query result set 24 according to a serializable format, such as a variant of the Extensible Markup Language (XML).) However, a second user 42 may submit a second query 20 that results in a large query result set 24, which the relational database server 44 may have inadequate memory to handle, and which may consume a large amount of bandwidth to return to the second user 42 over the network 48, which may diminish the performance of the relational database server 44 in evaluating the concurrently processing first query 20 and in returning the first query result set 24 to the first user 42. In order to reduce such difficulties, the relational database server 44 may specify various thresholds, such as a duration threshold 50 (e.g., 100 milliseconds) beyond which relational queries 20 may be terminated. Therefore, when a third user 42 and a fourth user 42 respectively submit a third relational query 20 and a fourth relational query 20, the relational database server 44 may monitor the durations 52 of the evaluation of the respective relational queries 20. The relational database server 44 may therefore permit the completion and return of a third query result set 24 for the third relational query 20 that finishes evaluation in 31 milliseconds, but may terminate the fourth relational query 20 upon determining that 127 milliseconds have elapsed without completion, and may return an error 54 to the fourth user 42 regarding the failed evaluation of the fourth relational query 20. While this technique might reduce the incidence of significant performance delays, it may be unacceptable to refuse to evaluate some relational queries 20 submitted by users 42 (who may be paying customers of the relational database service) on the basis of complexity.

In accordance with these observations, techniques are disclosed herein to manage relational queries 20 in a manner that promotes the complete evaluation thereof, even for highly complex relational queries 20 that involve a large number of records 18 and/or a high level of evaluative complexity. These techniques involve an automated identification of locations within a relational query 20 where the evaluation may be partitioned into a set of query slices that are equivalent in logic to the original relational query 20, but wherein each query slice may be executed during a successive iteration (e.g., in a time-share processing model), and wherein less complex relational queries 20 and/or query slices of other complex relational queries 20 may be evaluated in the interim. The resulting set of query slices comprises a query plan that accurately specifies the evaluation of the relational query 20, but enables an iterative approach to the evaluation and application thereof. In contrast with the suspension of the relational query 20 at an arbitrary point (e.g., periodically suspending and resuming a thread that encapsulates the evaluation of a relational query 20), each identified query slice leaves the relational data set 12 in a consistent state, while also persisting the intermediate results of the evaluation. In particular, the techniques presented herein involve the generation of many candidate query plans based on a particular relational query 20, where each candidate query plan features a different set of query slices that result in an equivalent evaluation and application of the relational query, and the selection of a query plan among the candidate query plans that performs the relational query 20 efficiently but within the constraints established by the relational database server 44. Moreover, the techniques presented herein enable a proactive culling of the potentially large search space of candidate query plans by discarding candidate query subplans that are unlikely to be included in an efficient query plan.

Figure 3:
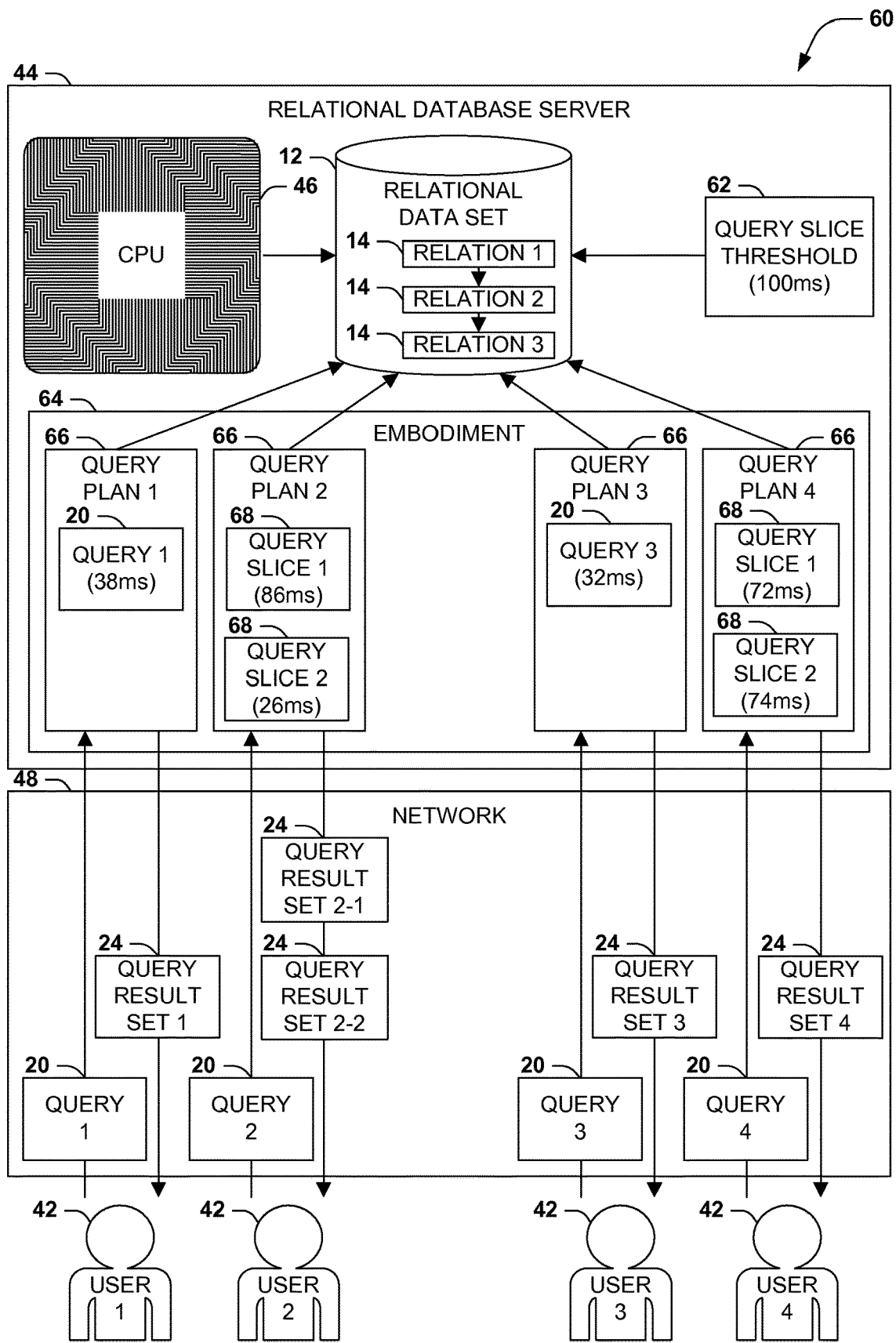
FIG. 3 is an illustration of an exemplary scenario featuring an application of queries to a relational data by a relational database server in accordance with the techniques presented herein.

FIG. 3 presents an exemplary scenario 60 featuring a relational database server 44 configured to utilize the techniques presented herein to achieve the concurrent evaluation of a set of relational queries 20 without exhibiting a loss of performance while evaluating complex relational queries 20 submitted over a network 48 by various users 42. In this exemplary scenario 60, the relational database server 44 again hosts a relational data set 12 comprising a set of relations, and features a processor 46 that may execute software instructions that are configured to administrate the relational data set 12 and to evaluate relational queries 20. However, before a relational query 20 submitted by a user 42 is delivered to the relational data set 12 for evaluation, it is preevaluated by an embodiment 64 of these techniques, which generates a query plan 66 for executing the relational query 20. In particular, for each relational query 20, the embodiment 64 generates a query plan 66 comprising a set of one or more query slices 68 that together perform an equivalent evaluation as the original relational query 20, but that may be executed in successive iterations (e.g., in successive time shares of the process 46) while leaving the relational data set 12 in a consistent state between iterations. Additionally, the embodiment 64 selects query plans 66 where the duration of the evaluation for each query slice 68 is estimated to be below a query slice threshold 62 defined by the relational database server 44 (e.g., a duration threshold of 100 milliseconds for each query slice 68.)

The embodiment 64 generates query plans 66 in the following manner. For some relational queries 20, such as the first relational query 20 submitted by the first user 42, the embodiment 64 may determine that the entire relational query 20 may be evaluated in one iteration without exceeding the query slice threshold 62, and the embodiment 64 may generate a query plan 66 comprising the original relational query 20. However, for the second relational query 20, the embodiment 64 may identify that the query result set 24 comprises too many records 18 to be delivered over the network 48 in one iteration. Therefore, for the second relational query 20, the embodiment 64 may generate a second query plan 66 that partitions the delivery of the query result set 24 into two batches, such that a first query slice 68 performs the evaluation and returns a first set of query results 26, and a second query slice 68 returns a second set of query results 26. While the combined estimated evaluation duration of the second query plan 66 might exceed the query slice threshold 62, and may even exceed the estimated evaluation duration of the unpartitioned relational query 20 (due to additional overhead involved in implementing the iterative aspects of the second query plan 66), each individual query slice 68 has an estimated processing duration below the query slice threshold 62. Similarly, the fourth relational query 66 may have an estimated evaluation duration above the query slice threshold 62, but may be partitioned into a query plan 66 comprising two query slices 68 that each features an estimated evaluation duration below the query slice threshold 62, and may therefore be applied to the relational data set 12 in an iterative manner instead of resulting in a rejection of the relational query 20 and the presentation of an error 54, as per the exemplary scenario 40 of FIG. 2. In this manner, the processor 46 of the relational database server 44 may iteratively process the query slices 68 of the various query plans 66 in an interleaved manner, thereby achieving high utilization of the computing resources of the relational database server 44 without involving a processing delay for complex relational queries 24 or a potentially inconsistent state of the relational data set 12.

The techniques presented herein, such as in the exemplary scenario 60 of FIG. 3, are achieved through the insertion into a relational query 20 of one or more spool operator and scan operator pairs. Many relational query languages and database management systems involve one or more operators that are configured to spool the results of an evaluation of one or more relations 14, e.g., as a temporary relation. Additionally, the contents of the temporary relation may be read at a later point in the relational query 20 through the use of a scan operator, which reads an intermediate result set (e.g., the records 18 of the temporary relation) and that provides such query results 26 to the next operation in the query plan 66. It may be possible to partition the relational query 20 between a spool operation, which stores an intermediate result of the evaluation of the relational query 20 to a persistent temporary relation, and a scan operation, which loads the intermediate result from a temporary relation in order to continue evaluation with the next operation. Moreover, it may be possible to consider several candidate query plans that partition the relational query 20 by spooling the intermediate results generated by each non-terminal operator 22 of the relational query 20, and by scanning the intermediate results before beginning the next operator 22. Additional variations relate to parameterized spooling, wherein the intermediate results of an operator 22 are written to several temporary relations (based on partitioning of the intermediate results using two or more ranges of a particular attribute 16), each of which may be evaluated upon successive iterations of the evaluation of the relational query 20, and/or parameterized scanning, wherein a series of scans may be performed on one or more relations 14, and where each scan yields a subset of the records 18 from the one or more relations 14 (based on partitioning the records 18 using two or more ranges of a particular attribute 16) for processing by an operator 22. These variations comprise additional partitioning options that may be considered while generating the set of candidate query plans.

Figure 4:
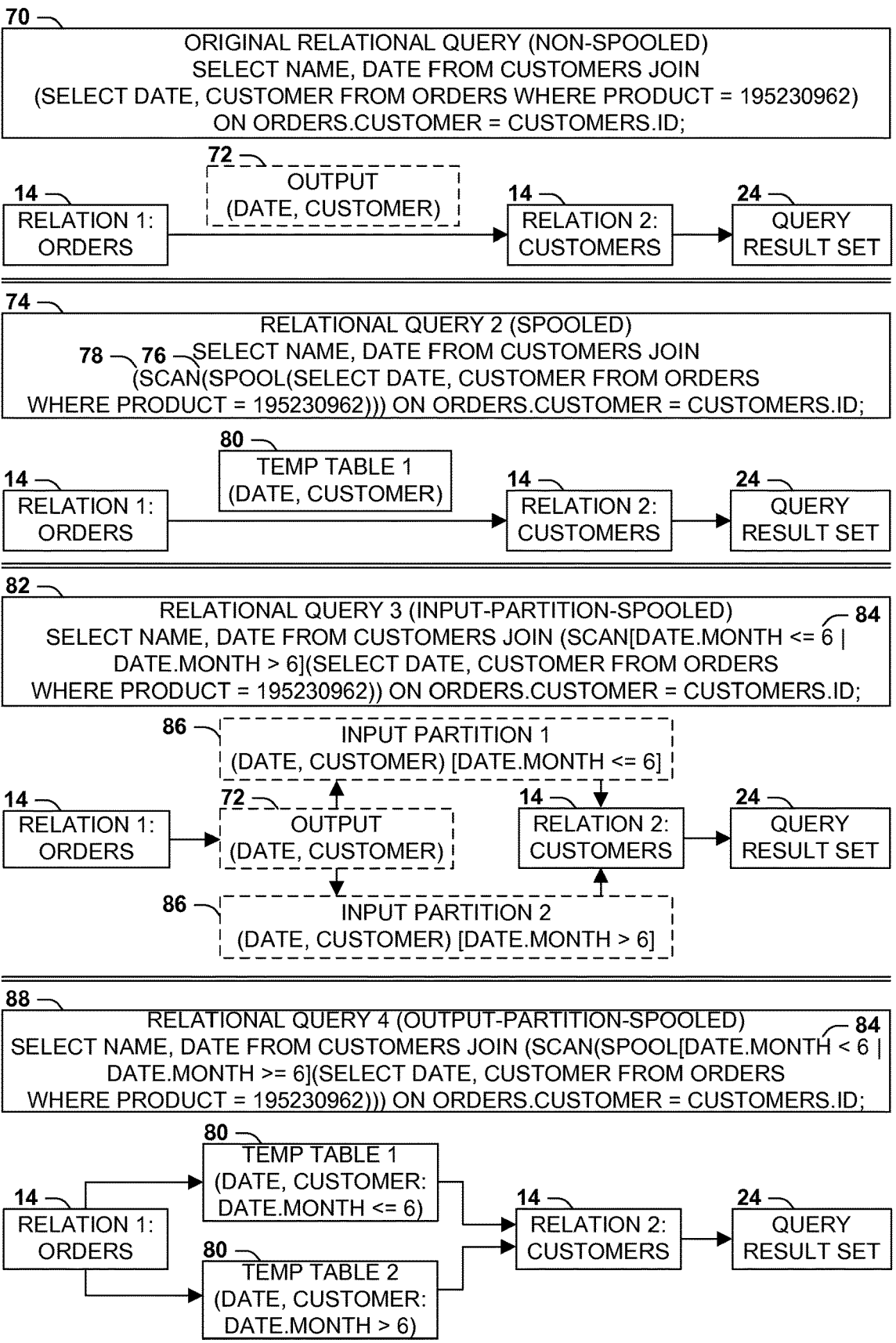
FIG. 4 is an illustration of an exemplary scenario featuring various types of spool operators incorporated into a relational query.

FIG. 4 presents some exemplary partitions of a relational query based on the introduction of various types of spool operators and scan operators. As illustrated in FIG. 4, an original relational query 70 is provided that selects the names of all customers who have ordered a particular product and the date of the order. This original relational query 70 achieves this selection by selecting particular records 18 from a first relation 14 (e.g., the "Orders" relation 14 illustrated in FIG. 1), projecting a few selected attributes 16 from the selected records 18 to produce an intermediate output 72 (which, as indicated by the dotted line, is held in memory and is not persisted to a relation 14 of the relational data set 12), joining the intermediate output 72 from the first relation with a second relation 14 (e.g., the "Customers" relation 14) on a particular set of attributes 16 (e.g., joining all records where the value of the "Customer" attribute 16 projected form the first relation 14 matches the "ID" attribute 16 of records in the second relation 14), and then projecting selected attributes 16 of interest from the selected, projected, and joined records 18 to produce a query result set 24. The original relational query 70 does not use any spool or scan operators, but simply specifies the performance of these operators 22 in sequence during a single iteration.

As further illustrated in FIG. 4, the original relational query 70 may be altered in many ways to incorporate various types of spooling. As a first example, a second relational query 74 may be generated by introducing a spool operator 76 that spools the result of the projection from the first relation 14 to a temporary relation 80, and a scan operator then scans the temporary relation 80 back into memory before performing the next operator 22 to tie this intermediate output 72 to the records 18 of the second relation 14 and projecting the specified attributes 16 to generate the query result set 24. While the second relational query 74 may be less efficient than the original relational query 70 (since additional processing resources are involved in writing the intermediate output 72 to a temporary relation and reloading the intermediate output 72), the introduction of the spool operator 76/scan operator 78 pair may enable a partitioning of the relational query 20 into a query plan 66 comprising two query slices 68 that are each estimated to involve an evaluation duration below the query slice threshold 62. (For example, this partitioning may be advantageous where the first relation 14 includes a large number of records 18, such that the selection and projection therefrom nearly exceeds the query slice threshold 62, and the partitioning of the relational query 20 after this selection and projection results in a query plan 66 having query slices 68 below the query slice threshold 62.)

As further illustrated in FIG. 4, a second exemplary use of spooling is illustrated as a third relational query 82 that involves an input partitioning of the intermediate output 72 of the projection of the records 18 selected from the first relation 14. The input partitioning involves partitioning the records 72 of one or more relations 14 (in this case, the projection of records 18 in the intermediate output 72) into two or more subsets of records 18, based on specified ranges. In the third relational query 82, the records 18 of the intermediate output 72 are partitioned into two subsets based on a set of ranges 84, e.g., whether the "month" of the date of the order is within the first six months of a particular year (where such records 18 are partitioned into a first input partition 86) or is within the last six months of a particular year (where such records 18 are partitioned into a second input partition 86.) The next operator 22 in the sequence (comprising the joining of the partitioned records 18 on an attribute of another relation 14) may iteratively process the first input partition 86 and the second input partition 86, and, during each iteration, may join the records 18 of the second relation 14 with the records 18 in one such input partition 86. The results of this join operator 22 may then be projected into the query result set 24. Again, while the third relational query 82 may be less efficient than the original relational query 70 (since additional processing resources are involved in partitioning the records 18 of the intermediate output 72 into two distinct input partitions 86), the introduction of the input-partitioned spool operator 76/scan operator 78 pair may enable a partitioning of the relational query 20 into a query plan 66 comprising two query slices 68 that are each estimated to involve an evaluation duration below the query slice threshold 62. (For example, this partitioning may be advantageous where the intermediate output 72 from the first relation 14 includes many records 18 such that the joining with the second relation 14 may exceed the query slice threshold 62, whereas a partitioning of the intermediate output 72 permits an iterative joining in two query slices 68 that are each below the query slice threshold 62.)

As further illustrated in FIG. 4, a third exemplary use of spooling is illustrated as a third relational query 88 that involves an output partitioning of the intermediate output 72 of the projection of the records 18 selected from the first relation 14. The records 18 selected from the first relation 14 are written to one of two temporary relations 80 based on ranges 84 that specify whether the month value for the date attribute 16 of the projection is within the first half of a year or within the second half of a year. The subsequent join operator 22 may consume both temporary relations 80 while joining the records 18 of the second relation 14 and projecting the selected attributes 16 into the query result set 24. Again, while the fourth relational query 88 may be less efficient than the original relational query 70 (since additional processing resources are involved in partitioning the records 18 of the first relation 14 into two partitions, writing the projections to temporary relations 80, and scanning these temporary relations 80 while joining with the second relation 14), the introduction of the output-partitioned spool operator 76/scan operator 78 pair may enable a partitioning of the relational query 20 into a query plan 66 comprising two query slices 68 that are each estimated to involve an evaluation duration below the query slice threshold 62. (For example, this partitioning may be advantageous where the first relation 14 includes so many records that the selection and projection cannot be performed within the query slice threshold 62, but evaluating two subsets of the records 18 of the first relation 14 permits an iterative selection and projection in two query slices 68 that are each below the query slice threshold 62.)

Although not illustrated in FIG. 4, it may be appreciated that additional variations of spool operators 76 and scan operators 78 may also be available. As a first example, a single operator 22 may be both input- and output-partitioned, such that the operator 22 (during successive iterations) scans a different subset of records 18 from a relation 14, performs an operation (such as a selection or projection) on the subset, and writes each record 18 of the output to one of a set of temporary relations 80. Moreover, an operator 22 that is both input- and output-partitioned may perform such partitioning over the same attribute 16 with the same range 84, over the same attribute 16 with a different range 84, or over different attributes 16. As a second example, a partitioning may be maintained through several operations. For example, if three successive operators 22 utilize an input- and output-partitioning on the same attribute 16 and over four discrete ranges 84, it may be advantageous to write the output-partitioned results of the first operator 22 to four temporary relations 80 and to continue storing the records 18 within the same four temporary relations 80 through the following operators 22, instead of repeatedly deleting the temporary relations 80 following each input-partitioned scan operator 78 and generating new temporary relations 80 during each output-partitioned spool operator 76.

The exemplary relational queries presented in FIG. 4 may therefore be inserted into various candidate query plans that each specifies a different partitioning of the original relational query 70. In particular, according to the techniques herein, each candidate query plan is evaluated to identify a candidate relational query that satisfies (at least) two conditions: (1) each query slice 68 has an estimated evaluation duration below the query slice threshold 62, and (2) the total estimated evaluation duration is lower than the total estimated evaluation durations of other candidate query plans for the relational query 20 that satisfy the first condition. Therefore, this comparison evaluates both the "shallow costs" of each query slice 68 and the "deep cost" of the entire query plan 66 of respective candidate query plans. The generation and comparison of various candidate query plans results in the selection of an efficient query plan 66 among the set of candidate query plan whereby the logic of the original relational query 70 may be evaluated and applied to the relational data set 12 in an iterative manner in accordance with the techniques presented herein.

Figure 5:
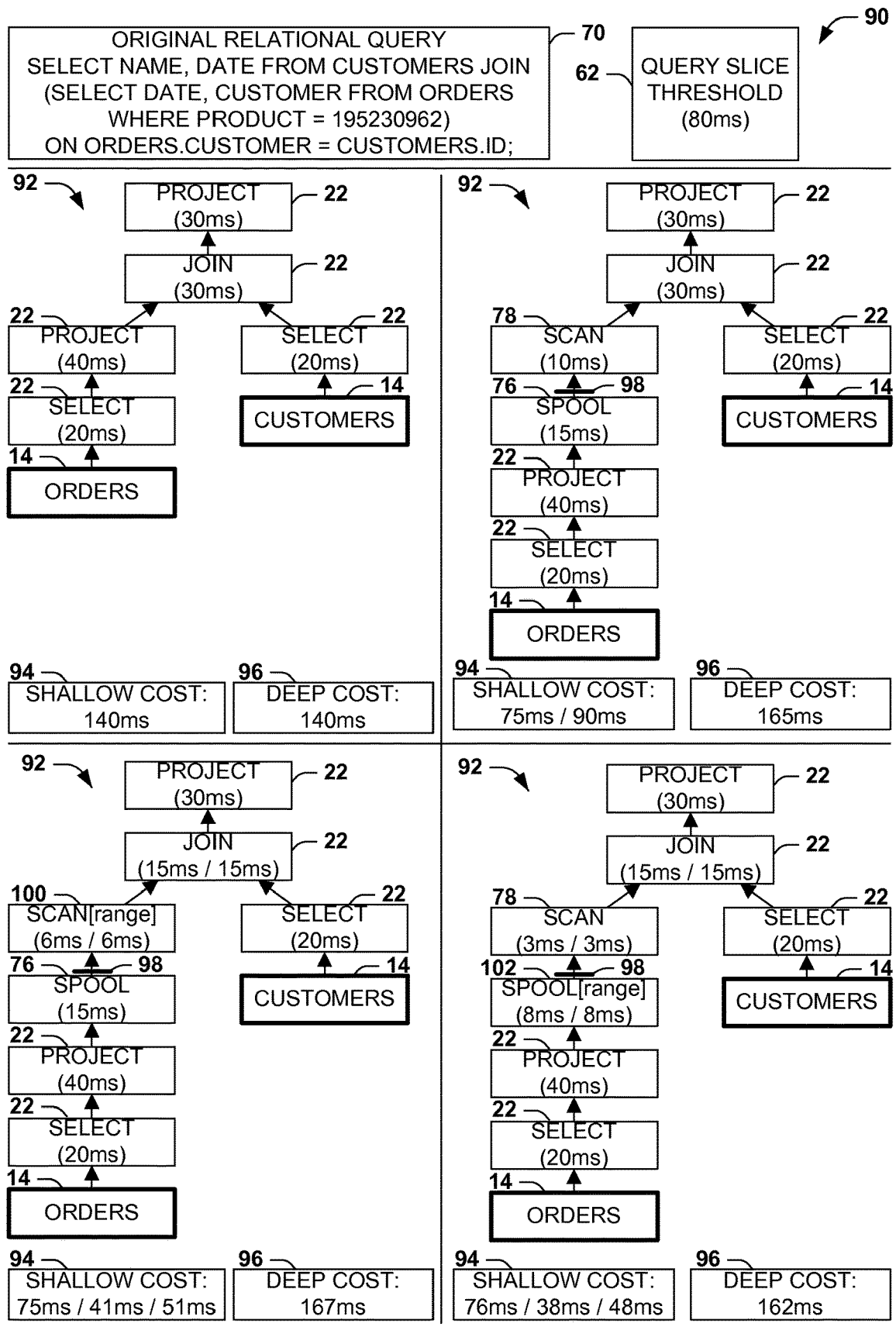
FIG. 5 is an illustration of an exemplary scenario featuring an evaluation of candidate query plans derived from a relational query in accordance with the techniques presented herein.

FIG. 5 presents an exemplary scenario 90 featuring a comparison of various candidate query plans to identify an efficient query plan 66. In this exemplary scenario 90, an original relational query 70 is provided that utilizes neither spool operators 76 nor scan operators 78, and that is therefore not partitioned and is evaluated in a single iteration (which may cause performance issues as illustrated in the exemplary scenario 40 of FIG. 2.) Accordingly, a first candidate query plan 92 may be considered, wherein various operators 22 are applied to the records 18 from each of the relations 14 specified in the original relational query 70 (where each relation 14 is illustrated with a thick border) to produce a desired result. In accordance with the techniques presented herein, the duration of this first candidate query plan 92 is estimated as both a shallow cost 94 indicating the estimated duration of each query slice 68 and a deep cost 96 indicating the estimated duration of the entire first candidate query plan 92. Because this first candidate query plan 92 does not partition the original relational query 70, these costs are identical. If the deep cost 96 is below the query slice threshold 62, then this first candidate query plan 92 is selected, since every candidate query plan that adds partitioning to this first candidate query plan 92 is inherently less efficient and more costly. However, in this exemplary scenario 90, the deep cost 96 of the first candidate query plan 92 exceeds the query slice threshold 62, so various candidate query plans are considered that partition the original relational query 70 in various ways.

As further illustrated in FIG. 5, a second candidate query plan 92 is generated and considered that inserts a spool operator 76 and a scan operator 78 between the projection operator 22 from the first relation 14 and the join operator 22, thereby creating a partitioning 98 of the second candidate relational query 92 between the spool operator 76 and the scan operator 78. The costs of this second candidate query plan 92 may be calculated, e.g., as a first shallow cost 94 for the operators 22 before the partitioning 98 and a second shallow cost 94 for the operators 22 after the partitioning 98, and a deep cost 96 for all of the operators 22. For this second candidate query plan 92, the shallow costs 94 are calculated for each iteration as 75 milliseconds and 90 milliseconds, which are closes to the query slice threshold 62 than the first candidate query 92, but are still not acceptable. Additionally, the deep cost 96 for the second candidate query plan 92 is slightly higher than for the first candidate query plan 92 due to the inclusion of the spool operator 76 and the scan operator 78.

As further illustrated in FIG. 5, a third candidate query plan 92 may be generated and evaluated that involves a parameterized input partitioning before the join operator 22, e.g., by inserting a (non-parameterized) spool operator 76 after the project operator 22 of the first relation 14, followed by a parameterized scan operator 100 that, from the temporary relation 80 generated by the spool operator 76, reads records 18 in two or more subsets as defined by various ranges 84 specified by the parameterized scan operator 100. This partitioning 98 results in three query slices 68: a first query slice 68 ending with the spooling of the results of the projection operator 22 from the first relation 14, and two additional query slices 68 for the two respective subsets generated by the parameterized scan operator 100. The deep cost 96 for this third candidate query plan 92 may be calculated, and the shallow costs 94 of the query slices 68 may be calculated (presuming that the shallow cost of the selection operator 22 for the second relation 14 are included in the first of the two query slices 68 as the cost of materializing the set of joined results), thereby resulting in a valid candidate query plan 92 having the shallow cost 94 of each query slice 68 below the query slice threshold 62. However, it is not yet determined that this candidate query plan 92 is more efficient than other valid candidate query plans 92, so additional candidate query plans 92 are also considered.

As further illustrated in FIG. 5, a fourth candidate query plan 92 is generated and considered that includes a parameterized spool operator 102, which generates multiple temporary relations 80 from the projection operator 22 of the first relation 14 based on the ranges 84 specified by the parameterized spool operator 102. Again, the shallow deep cost 96 and the shallow costs 94 of respective query slices 68 are calculated, resulting in a determination that this fourth candidate query plan 92 is valid (e.g., having a shallow cost 94 for each query slice 68 below the query slice threshold 62) and has a lower deep cost 96 than the third candidate query plan 92. As a result of this comparison, the fourth candidate query plan 92 is selected as the query plan 66 whereby the original relational query 70 may be efficiently performed over several iterations that are each below the query slice threshold 62. Therefore, this query plan 66 may be submitted to the relational data set 12 and processed in three iterations to generate a query result set 24 while respective the defined query slice threshold 62 to reduce performance issues, with persistence of intermediate results between partitioned iterations. Moreover, the generation and selection of this query plan 66 according to the techniques presented herein is performed in an automated manner that does not involve redesign by a user.

Figure 6:
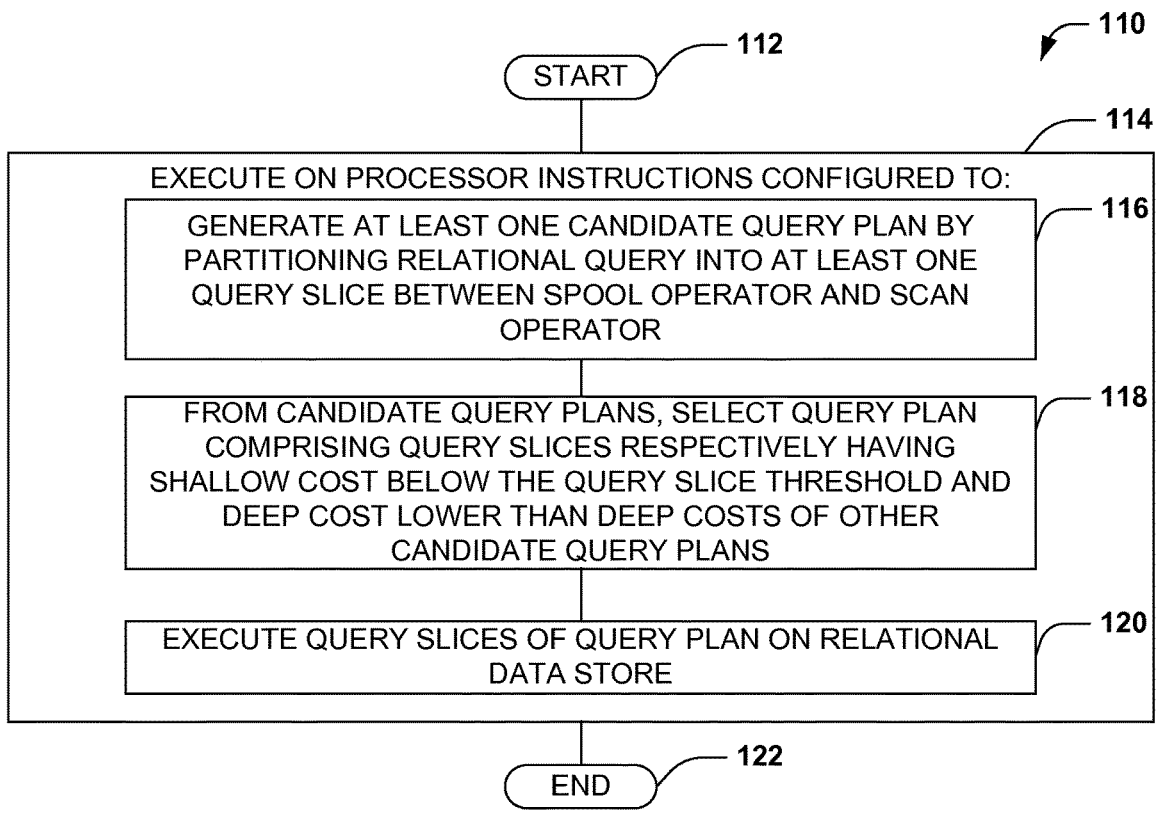
FIG. 6 is a flow chart illustrating an exemplary method of applying a relational query comprising at least one operator to a relational data set.

FIG. 6 presents a first embodiment of these techniques, illustrated as an exemplary method 110 of applying a relational query 20 comprising at least one operator 22 to a relational data set 12. The exemplary method 110 may comprise, e.g., a set of software instructions stored on a volatile or nonvolatile memory (e.g., system memory, a hard disk drive, a solid state storage device, or a magnetic or optical disc) of a device having a processor 46 (such as a relational database server 44) and that defines a query slice threshold 62. The exemplary method 110 begins at 112 and involves executing 114 on the processor 46 instructions configured to perform the techniques presented herein. In particular, the instructions are configured to generate 116 at least one candidate query plan 92 by partitioning the relational query 20 into at least two query slices 68 between a spool operator 76 and a scan 78 operator. The instructions are also configured to, from the candidate query plans 92, select 118 a query plan 66 comprising query slices 68 respectively having a shallow cost 94 below the query slice threshold 62 and a deep cost 96 that is lower than the deep costs 96 of other candidate query plans 92. The instructions are also configured to execute 120 the query slices 68 of the query plan 66 on the relational data set 12. Having achieved the automated selection of an efficient query plan 66 partitioned for iterative and persistent evaluation and application to the relational data set 12, the exemplary method 110 ends at 122.

Figure 7:
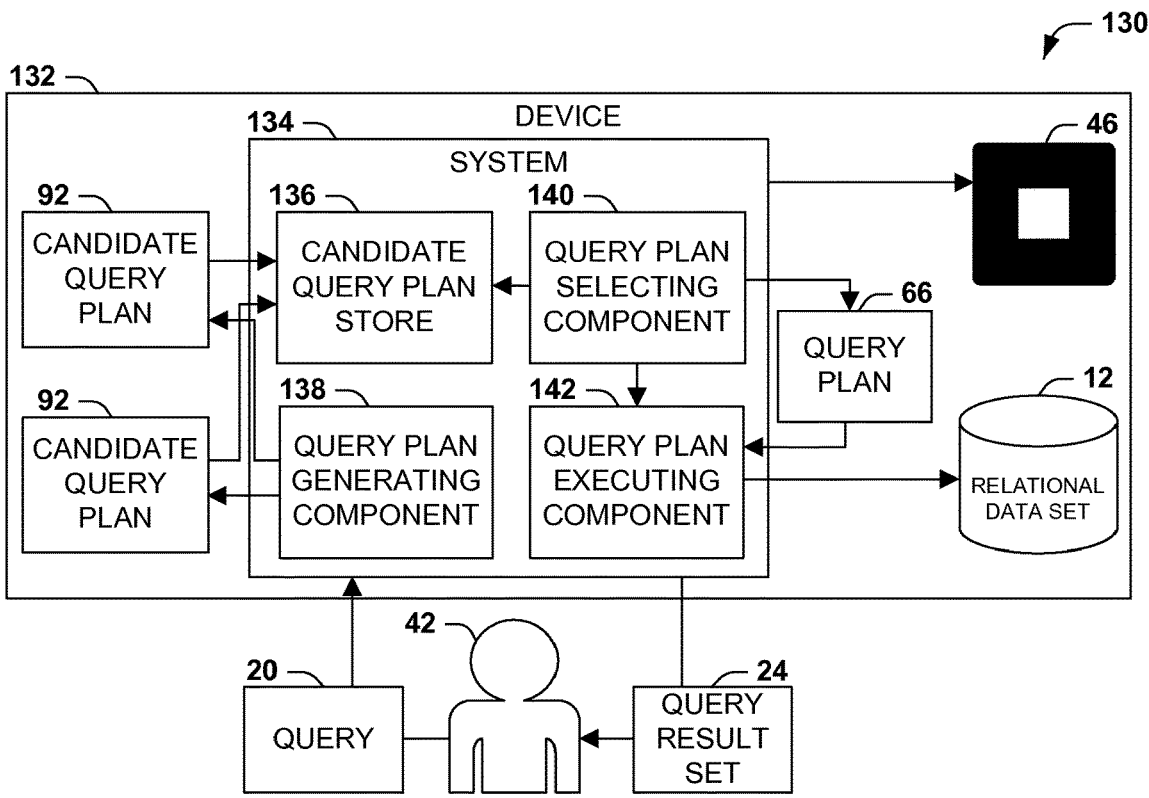
FIG. 7 is a component block diagram illustrating an exemplary system for applying a relational query comprising at least one operator to a relational data set.

FIG. 7 presents a second embodiment of these techniques, illustrated as an exemplary system 134 configured to apply a relational query 20 submitted by a user 42 comprising at least one operator 22 to a relational data set 12 respecting a query slice threshold 62. The exemplary system 134 may be implemented, e.g., as an architecture comprising a set of components, each comprising as a set of software instructions stored on a memory of a device 132 having access to a relational data set 12 (such as a relational database server 44), and that, when executed on a processor 46 of the device 132, interoperate to perform the techniques presented herein and return a query result set 24 to the user 42. The exemplary system 134 comprises a candidate query plan store 136, which is configured to store various candidate query plans 92 that are respectively associated with at least one relation 14 and a sort order. The exemplary system 134 also comprises a query plan generating component 138, which is configured to generate at least one candidate query plan 92 by partitioning the relational query 20 into at least two query slices 68 between a spool operator 76 and a scan operator 78. The exemplary system 134 also comprises a query plan selecting component 140, which is configured to, from the candidate query plans 92, select a query plan 66 comprising query slices 68 respectively having a shallow cost 94 that is below the query slice threshold 62 and a deep cost 96 that is lower than the deep costs 96 of other candidate query plans 92. The exemplary system 134 also comprises a query plan executing component 142, which is configured to execute the query slices 68 of the query plan 66 on the relational data set 12. In this manner, the components of the exemplary system 134 interoperate to achieve the generation and selection of a query plan 66 that may be automatically partitioned into a set of query slices 68 that are iteratively executed on the relational data set 12 to generate and return to the user 42 a query result set 24 in accordance with the techniques presented herein.

Figure 8:
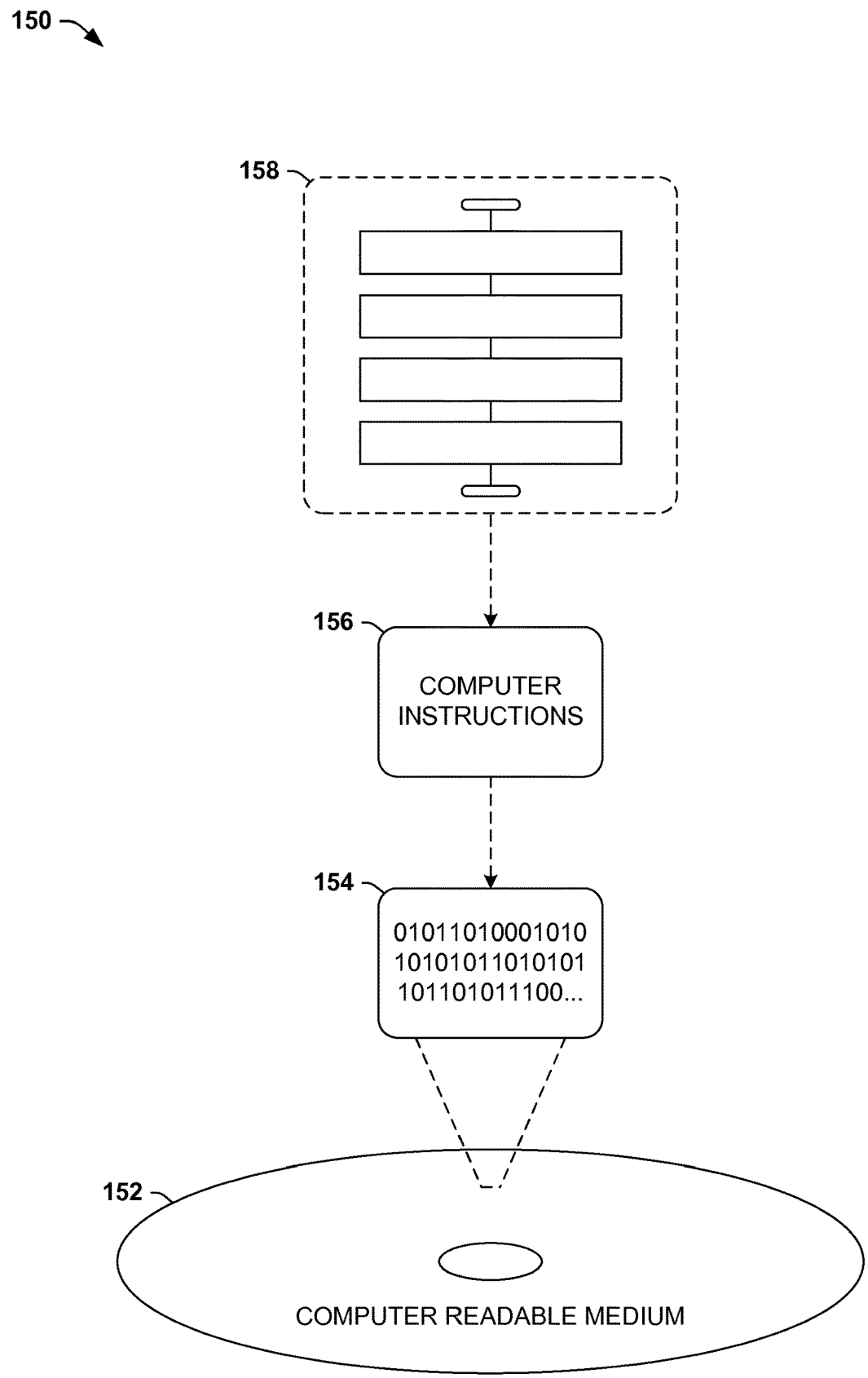
FIG. 8 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 8, wherein the implementation 150 comprises a computer-readable medium 152 (e.g., a CD-R, DVD-R, or a platter of a hard disk drive), on which is encoded computer-readable data 154. This computer-readable data 154 in turn comprises a set of computer instructions 156 configured to operate according to the principles set forth herein. In one such embodiment, the processor-executable instructions 156 may be configured to perform a method of applying a relational query comprising at least one operator to a relational data set, such as the exemplary method 110 of FIG. 6. In another such embodiment, the processor-executable instructions 156 may be configured to implement a system for applying a relational query comprising at least one operator to a relational data set, such as the exemplary system 134 of FIG. 7. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 110 of FIG. 6 and the exemplary system 134 of FIG. 7) to confer individual and/or synergistic advantages upon such embodiments.

A first aspect that may vary among embodiments of these techniques relates to the manner of computing the shallow costs 94 and the deep costs 96 of various query plans 66. As a first example, for a particular operator 22, many basic estimation techniques are available for estimating a local cost of the operator 22, e.g., based on the number of records 18, attributes 16, and relations 14 targeted by the operator 22 and the type of operation applied thereby. As a second example of this first aspect, these basic estimation techniques for estimating a local cost of an operator 22 may be utilized to compute estimates of the shallow cost 94 and the deep cost 96 of the query plan 66 through several calculations. If a local cost estimation technique is available for a particular operator 22, then for a particular plan P, having at its root an operator ρ and having subplans $p_1 \ldots p_n$, the shallow cost 94 of a query plan 66 associated with a query slice 68 may be estimated according to the mathematical formula:

$$SC(\rho) = \max_i (LC(\chi(\rho')[r_i])) + SC(\rho'[r_i])$$

In this mathematical formula:
ρ represents a root operator 22 of the query plan;
SC(ρ) represents an estimated shallow cost 94 of the root operator ρ;
LC(ρ) represents an estimated local cost of the root operator ρ;
$\rho'[r_i]$ represents a subplan parameterized over range $[r_i]$; and
$\chi(\rho'[r_i])$ represents an input parameterized subplan for subplan ρ' over range $[r_i]$.

As a third example of this first aspect, the deep cost 96 of a query plan 66 associated with a query slice 68 may be estimated according to the mathematical formula:

$$DC(\rho) = \sum_{i=1}^{n} LC(\chi(\rho'[r_i])) + DC(\rho'[r_1]) + \sum_{i=2}^{n} SC(\rho'[r_i])$$

In addition to the defined symbols above, in this mathematical formula: $DC(\rho'[r_1])$ represents an estimated deep cost of a first range over an input parameterized subplan ρ'.

However, those of ordinary skill in the art may devise many ways of computing the shallow costs 94 and the deep costs 96 of a query plan 66 while implementing the techniques presented herein.

A second aspect that may vary among embodiments of these techniques relates to the manner of generating candidate query plans 92, and of selecting an efficient query plan 66 from among the set of candidate query plans 92. Several exemplary techniques are presented herein (in FIGS. 9, 10, 13, 14-15, and 16) for generating the selection of the query plan 66. The first exemplary technique relates to a comparatively simple selection of a query plan 66, and the following exemplary techniques refine the preceding exemplary technique, e.g., to consider a broader set of candidate query plans 92 or to reduce the search space in order to improve the efficiency of the query plan selection process. It is to be appreciated that these exemplary techniques are but some ways of generating the candidate query plans 92 and selecting an efficient query plan 66 therefrom.

As a first example of this second aspect, a comparatively simple technique for generating candidate query plans 92 and selecting an efficient query plan 66 therefrom involves a top-down recursive examination of the order of join operators 22 among the relations 14 targeted by the relational query 20. A set of candidate query plans 92 may be generated by, for an original candidate query plan 92 (e.g., a candidate query plan 92 generated as a plain translation of an original relational query 70), a top-down, recursive approach may choose, within the relation set comprising the candidate query plan 92, a join operator 22 between a first relation and a second relation. In particular, a function may be devised to select, for a particular relation set to be generated with a particular sort order (possibly comprising "null" if no sort order is specified), a selection of a query plan 66 among all of the candidate query plans 92 for this relation set and sort order. In order to achieve this selection, the function may involve recursively evaluating the first relation (e.g., by invoking a plan selection function with the first relation) in order to identify a first query subplan that efficiently applies the operators 22 within the first relation, and recursively evaluating the second relation in order to identify a second query subplan that efficiently applies the operators 22 within the second relation. A candidate query plan 92 may then be generated based on a join of the first query subplan and the second query subplan. The shallow cost 94 and the deep cost 96 of this candidate query plan 92 may then be calculated and evaluated, e.g., to determine whether the shallow cost 94 of each operator 22 within the candidate query plan 92 is below the query slice threshold 62, and whether the deep cost 94 of the entire candidate query plan 92 is lower than the deep costs 94 of other candidate query plans 92 involving the same relation set and sort order. If so, then this candidate query plan 92 may be stored as the lowest-cost query plan 66 yet identified for this relation set and sort order (e.g., in a two-tuple query plan store that stores a query plan 66 for a particular relation set and sort order.) However, other iterations of the recursive search may lead to lower-cost query plans 66 for the same relation set and sort order, and the query plan store may replace the previously lowest-cost query plan 66 with the newly identified even-lower-cost query plan 66. When the recursion has completed, the lowest-cost query plan 66 returned for the top-level relation set and sort order may be selected as the query plan 66 for executing the relational query 20.

As a more detailed explanation of this first exemplary technique, a device configured to perform the techniques presented herein (such as a relational database server 44) may include a candidate query plan store 136, which may be configured to store, associated with a relation set and a sort order, a candidate query plan 92. This generating may be performed by, for a relation set specifying a sort order, generating a first candidate query plan 92 that incorporates the sort order and a second candidate query plan 92 that does not incorporate the sort order but that appends a sort operator, and comparing the deep costs 96 of the first candidate query plan 92 and the second candidate query plan 92. The generating may also involve, for a relation set comprising only one relation 14, generating a candidate query plan comprising the relation 14. Finally, the generating may be configured to, upon generating any candidate query plan 92, examining the candidate query plan store 136 for a current candidate query plan 92 that is associated with the relation set and the sort order, and storing the candidate query plan 92 in the candidate query plan store 136 (associated with the relation set and the sort order) if the candidate query plan store 136 does not store a current candidate query plan having a deep cost that is equal to or lower than the deep cost of the candidate query plan 92.

FIG. 9 presents an illustration of an embodiment of a first exemplary technique for performing the selection of a query plan 66 in this manner, illustrated as a code block 160 comprising software instructions that are configured to perform a recursive examination of the relation set in order to select a low-cost query plan 66. It may be appreciated that this code block 160, and the other code blocks 160 provided herein to illustrate other techniques, are presented as pseudocode, and are not formatted according to any particular programming language. Rather, the pseudocode within each code block 160 expresses the logical functionality of a particular technique presented herein, which may be implemented in a range of programming languages, including Java and C #.

The code block 160 presented in FIG. 9 begins with an "UpdateMemo" function that simply maintains a candidate query plan store 136 (named "Memo") that, for a particular relation set and sort order, stores a single low-cost query plan 66. Initially, the query plan store is initialized to an empty state, but as the recursive evaluation of the original query plan 66 progresses, the query plan store is populated with candidate query plans 92 for particular relation sets and sort orders pertaining to the original relational query 70. However, as specified in line [01] of the "UpdateMemo" function, a candidate query plan 92 is only stored in the query plan store if it is the lowest-cost candidate query plan 92 for a specified relation set R and the specified sort order SO. The code block 160 then presents a first version of a "SelectPlan" function that, based on a particular relation set R and a particular sort order SO, evaluates (at line [08]) each join operator 22 between two relations 14 in relation set R by recursively evaluating each relation 14, and then evaluating the query plan 66 represented by the joining of these two relations 14. This first version of the "SelectPlan" function also (at lines [02-04]) considers, for a relation set having a sort order, whether performing the sorting within a root operator 22 of the candidate query plan 92 for the relation set R may be less efficient than removing the sorting criterion from the root operator 22 and appending a sort operator 22 to the unsorted relation set (e.g., as a discrete sorting that is performed after the operation specified by the root operator 22.) In this manner, this first exemplary technique may generate, for a particular relation set R and sort order SO, a set of candidate query plans 92, and may compare the efficiency thereof through a recursive evaluation.

A second example of this second aspect involves an extension of the first exemplary technique to consider candidate query plans 92 that include spool operators 76 and scan operators 78 appended to particular operators 22. While the first exemplary technique illustrated in FIG. 9 achieves a significant exploration of the search space in reordering the operators 22 of the candidate query plan 92 for the original relational query 70, it does not utilize spool operators 76 and scan operators 78 to enable a partitioning of a candidate query plan 92 into query slices 68 that may persist intermediate output 72 across iterations by automatically storing and scanning the intermediate output 72 to a temporary relation 80. Therefore, in accordance with this second example, the first exemplary technique may be extended by generating, for a particular candidate query plan 92 having a root operator 22, a spooled candidate query plans 92 that appends a spool operator 76 and a scan operator 78 to the candidate query plan 92, and compares the deep costs 96 of the (unspooled) candidate query plan 92 and the spooled candidate query plan 92. Additionally, the candidate query plan store 136 may be extended to store more than one candidate query plan 92 for a particular relation set and sort order. This extension may be advantageous, e.g., where it cannot be determined which candidate query plan 92 may be included as a subplan in a lowest-cost query plan 66. For example, at an early stage in the recursive evaluation, a first candidate query plan 92 may be generated for a particular relation set and sort order and a second candidate query plan 92 may also be generated that appends a spool operator 76 and a scan operator 78 to the root operator 22 of the first candidate query plan 92. At this early stage, it may be not be possible to determine whether a lowest-cost query plan 66 might incorporate the spooled or unspooled version of this subplan, and so both candidate query plans 92 may be retained. In particular, whenever a candidate query plan 92 is added to the candidate query plan store 136, a "skyline" evaluation may be performed to evaluate and keep only the potentially promising candidate query plans 92 associated with the same relation set and sort order.

As a more detailed explanation of this second exemplary technique, a device configured to perform the techniques presented herein (such as a relational database server 44) may be configured to, upon generating a candidate query plan 92 associated with a relation set and a sort order, determine whether the candidate query plan 92 is within a skyline of candidate query plans associated with the relation set and the sort order, and if so, store the candidate query plan 92 in the candidate query plan store 136 associated with the relation set and the sort order. The device may also be configured to generate at least one candidate query plan 92 by joining a first candidate query plan 92 within the skyline of the first relation 14 and a second candidate query plan within the skyline of the second relation 14. In this manner, the second exemplary technique may extend the search space of the first exemplary technique to include the spooling and scanning of operators 22 within the candidate search plans 92.

FIG. 10 presents an illustration of an embodiment of a second exemplary technique for performing the selection of a query plan 66 in this manner, illustrated as a code block 170 comprising software instructions that are configured to perform a recursive examination of the relation set in order to select a low-cost query plan 66. The code block 170 begins with an "UpdateMemo" function that maintains a candidate query plan store 136 (named "Memo") that, in contrast with the "UpdateMemo" function presented in the code block 160 of FIG. 9, stores a set of low-cost candidate query plans 92 for a particular relation set and sort order. The particular candidate query plans 92 stored for a particular relation set and sort order are selected using a "skyline" function that identifies promising candidate query plans 92. The code block 170 then presents a second version of the "SelectPlan" function that, based on a particular relation set R and a particular sort order SO, evaluates (at line [15]) each join operator 22 between every first candidate relation plan 92 stored in the candidate query plan store 136 associated with the first relation and the sort order, and every second candidate relation plan 92 stored in the candidate query plan store 136 associated with the second relation and the sort order. For each relation R and sort order, promising candidate query plans 92 having satisfactory shallow costs 94 and comparatively low deep costs 96 are retained in the candidate query plan store 136. In addition, whenever this second version of the "SelectPlan" function generates and evaluates a first candidate query plan 92, it also (at lines [05], [09], and [18]) generates and evaluates a second query plan 92 that appends a spool operator 76 and a scan operator 78 to the root operator 22 of the first candidate query plan 92. In this manner, this second exemplary technique may generate, for a particular relation set R and sort order SO, a set of candidate query plans 92, and may compare the efficiency thereof through a recursive evaluation of many candidate query plans 92 and spooled versions thereof.

A third example of this second aspect involves an extension of the second exemplary technique to consider, in addition to candidate query plans 92 appending spool operators 76 and scan operators 78, the use of parameterized spool operators 76 and parameterized scan operators 78. For example, for a first candidate query plan 92 having a projection operator 22, whereas the second exemplary technique introduces the consideration of a second candidate query plan 92 that spools the results of the projection operator 22 and scans the spooled results (to create an opportunity for a partitioning of the relational query 20), this third exemplary technique introduces the consideration of parameterized spool operators 76 and scan operators 78 that may perform the spooling and scanning across desired two or more ranges 84. This extension may be advantageous, e.g., for examining relational queries 20 that involve a relation 14 of the relational data set 12 that is so large that any one-pass scan of the relation 14 exceeds the query slice threshold 62, and where only a parameterized scanning that partitions the scanning of the relation 14 into multiple subsets of records 18 may achieve a suitable query plan 66.

In particular, the identification of ranges 84 for parameterizing a particular relation 14 may be selected in various ways. The records 18 of the relation 14 may be divided into various partitions, where each partition comprises the records 18 having a value for a certain attribute 16 that falls within a range associated with the partition. However, the records 18 of a relation 14 may be parameterized on any attribute 16 thereof, and using a set of ranges 84 selected from many potential sets of ranges 84. For example, the ranges 84 may vary in number (e.g., two ranges to generate two partitions, three ranges to generate three partitions, etc.) and the value boundaries that define the number of records 18 in each partition.

One technique for identifying the ranges 84 over an attribute 16 for a parameterization of an operator 22 involves a binary search over the values in the domain of the attribute 16. For example, within the portion of the range beginning with a low boundary value, a theoretical upper boundary value exists that cannot be increased without including too many records 14 for processing within the query slice threshold 62, and the search for this upper boundary may be formulated as a binary search. Moreover, an error threshold may be defined to specify how close the current upper boundary value may be to the theoretical upper boundary value in order to comprise a "good enough" range 84 (e.g., such that the efficiency gained in further iterations of the binary search to identify a current upper boundary that is even closer to the theoretical upper boundary are offset by the computational resources involved in performing the further iterations.) This technique may be devised as an iterative process, beginning with the initiation of a range set, and initiating an unallocated range the full range of values over an attribute 16. While a local cost of processing the records 18 of the relation 14 within the unallocated range remains greater than the query slice threshold 62, an iterative process may be performed to identify an unallocated range portion having a local cost below the query slice threshold 62, adding the unallocated range portion to the range set, and removing the unallocated range portion from the unallocated range. One such variation that may be advantageous involves selecting an unallocated range portion having a local cost that approaches but does not exceed the query slice threshold 62, in order to utilize an iteration of the query evaluation as fully as possible. This iterative selection of ranges may continue until the records 18 remaining in the unallocated range may be processed within the query slice threshold 62, at which point the entire unallocated range may be added to the range set.

FIG. 11 presents a code block 180 that expresses this binary search technique for selecting a set of ranges 84 over an attribute 16 of a relation 14, such that the records 18 of the relation 14 included in each partition may be processed within the query slice threshold 62. The binary search begins by selecting a low boundary value in the domain of the attribute 16, and may seek to extend the upper boundary value to encompass as many records 18 as may be processed within the query slice threshold 62, thereby reducing the number of partitions and increasing the efficiency of the processing of the relational query 20. Moreover, the extension of the upper boundary value may be performed as a binary search process; e.g., if the number of records 18 included in the range 84 between the lower boundary and the current upper boundary exceeds the query slice threshold 62, then the upper boundary may be moved downward (by increasingly small amounts pursuant to the binary search process), and may be moved upward if the number of records 18 included in the range does not exceed the query slice threshold 62. This binary search process may continue, e.g., until the upper boundary of the range is established within a suitably small error threshold between the current upper boundary and the theoretical upper boundary may exist. The range 84 defined by the lower boundary and the current upper boundary is then added to the range set, and the remaining unallocated range may be processed again (starting with a new low boundary value set equaling the current upper threshold value of the previous range 84.)

FIG. 12 presents an illustration of an exemplary scenario 190 featuring an implementation of this binary search. In this exemplary scenario 190, a binary search is performed to identify a range 84 over the values in the domain of an attribute 14 that encompasses as many records 18 of a relation 14 that may be processed within a defined query slice threshold 62 (represented in FIG. 12 as $\Delta$.) Additionally, the binary search may define an error threshold $\varepsilon$ indicating a sufficient proximity of the size of the range 84 to the theoretical size of the range 84 that may fully utilize the query slice threshold 62. A first range 192 may be evaluated between a (fixed) low value in the domain of the attribute 14 and a (movable) current upper boundary, which is initially set at a midpoint between the lower boundary value and a high boundary value in the domain of the attribute 14. This first range 192 encompasses too many records 18 to be processed within the query slice threshold 62, so the current upper boundary is recued by half to define a second range 194. Conversely, this second range 194 encompasses enough records 18 to be processed within the query slice threshold 62, so the current upper boundary is moved upward (by half the distance of the previous move) to test whether an expanded range 84 may include more records 18 without exceeding the query slice threshold 62. The third range 196 again encompasses too many records 18, so the current upper boundary is reduced to define a fourth range 198. At this point in the binary search, the distance that may be moved by further iterations of the binary search is smaller than an error threshold (e.g., the current upper boundary is sufficiently close to the theoretical upper boundary), and so the fourth range 198, defined by the lower boundary value and the current upper boundary value, is added to the range set 200 of values for the specified attribute 16 that partition the records 18 of the relation 14 for an iteration of the parameterized operator 22. For the remaining unallocated values of the domain of the attribute 16 (comprising records 18 that have not yet partitioned into a range 84), a second binary search may be performed, beginning with a low boundary value set at the current high boundary value for the previous range 84. Ranges 84 may continue to be identified and added to the range set 200 until all of the remaining records 18 in the unallocated range may be processed within the query slice threshold 62, at which point a final range 84 may be declared having a high boundary value set at the high value within the domain of the attribute 16.

An additional variation of this binary search technique relates to the problem of data skew. In some scenarios, the records 18 of a relation 14 may be evenly distributed over a particular attribute 16 (e.g., where the attribute 16 comprises a relational key, such that the values of various records 18 are either incrementally or randomly assigned), and the resulting ranges 84 selected by the binary search over the attribute 16 may be of similar sizes. However, in other scenarios, the records 18 may be unevenly distributed; e.g., if a large number of records 18 are densely crowded around a particular value for the attribute 16 where a theoretical upper boundary of a range 84 may exist, it may be difficult to identify a suitable range 84, because small movements in the current upper boundary may result in large changes in the number of records 18 partitioned within the range 84. Indeed, in some cases (e.g., where a very large number of records 18 share a particular value for an attribute 16), the skew may be so large that a suitable range 84 cannot be identified, because the inclusion of all of the records 18 may exceed the query slice threshold 62 but exclusion of all of the records 18 (through a slight downward movement of the current upper boundary of the range 84) may result in a significantly unfilled range 84 with a small number of records 18. In such circumstances, it may be desirable, upon failing to partition a range 84 into at least two ranges 84 having a shallow cost 94 not exceeding the query slice threshold 62, to identify a secondary attribute 16, and to generate the parameterized spooled candidate query plan parameterized based upon the secondary attribute 16. In the second attempt to choose suitable partitions, an embodiment may utilize the secondary attribute 16 in place of the first selected attribute 16, or supplemental to the first selected attribute 16 (e.g., by partitioning the records 18 on the first attribute 16, and then on the secondary attribute 16.)

In view of these techniques for establishing ranges 84 of a parameterized operator 22, various embodiments may implement the third exemplary technique to evaluate candidate query plans 92 that utilize parameterized spool operators 76 and parameterized scan operators 78. In particular, a device 132 implementing the techniques presented herein (such as a relational database server 44) may, upon generating a candidate query plan 92, further generate a parameterized spooled candidate query plan, which parameterizes the operator 22 of the candidate query plan 92 upon an attribute 16 of a relation 14 utilized by the operator 22. The parameterized spooled candidate query plan may be generated by identifying at least two ranges 84 over the attribute 16 of the relation 14 (e.g., by using the techniques presented in FIGS. 11-12); inserting, before the operator 22, an output spool operator that is parameterized over the attribute 16 on the selected ranges 84; and inserting, after the operator 22, an input spool operator that is also parameterized on the selected ranges 84 over the attribute 16. The costs of this parameterized spooled candidate query plan may then be estimated, and the candidate query plan store 136 may be updated accordingly.

FIG. 13 presents a third exemplary technique for performing the selection of a query plan 66 in this manner, illustrated as a code block 210 comprising software instructions that are configured to perform a recursive examination of the relation set in order to select a low-cost query plan 66. The code block 210 begins with an "UpdateMemo" function that is unchanged from the equivalent function of the second exemplary technique (illustrated in the code block 170 of FIG. 10), and also includes a "SelectPlan" function that proceeds in a similar manner as the equivalent function of the second exemplary technique. However, at lines [19]-[23] of this code block 210, this third exemplary technique endeavors to generate and evaluate additional candidate query sets 92 that include parameterized operators 22. In particular, if the inputs of a particular join operator 22 are temporary relations 80 materialized by a prior operator 22, the third exemplary technique identifies an attribute 16 involved in the joining of the temporary relations 80, and a selection of suitable ranges 84 over the attribute 16. A new candidate query plan 92 may be considered that alters a preceding spool operator (either a non-parameterized spool or an input-parameterized spool) by adding a parameterized output-spooled aspect (thereby resulting in either an output-parameterized spool or an input-and-output-parameterized spool) based on the selected ranges 84. The costs of this candidate query plan 92 may then be evaluated, and the candidate query plan 92 may be added to the skyline of the candidate query plan store 136. In this manner, the evaluation of candidate query plans 92 may include parameterized operators 22 that may partition the application of operations 44 over various ranges 84 of involved relations 14.

A fourth example of this second aspect involves an extension of the third exemplary technique to consider, in addition to parameterized spooled candidate query plans that add a parameterized spooling and scanning to an operator 22, candidate query plans 92 that include "deep partitioning," which extends a parameterized spooling through several operators 22. In the third exemplary technique, the parameterized spooling is extended through the performance of a single operator 22, and is promptly "closed" by scanning the parameterized spooled results into a non-parameterized relation set before applying the next operator 22. However, if a partitioning of a working set of records 18 on a particular attribute 16 and set of ranges 84 is advantageous in several stages of a relational query 20, this third exemplary technique may partition and departition the same set of records 18 on the same attribute 16 and ranges 84 several times in sequence, thereby incurring significant inefficiency in repeated table formation, record partitioning and materialization, record departitioning, and table deletion. By contrast, in this fourth exemplary technique, the parameterized spooling of results persists through the application of a second operator 22 and possibly additional operators 22, before eventually being closed by an input-parameterized scanning that results in non-parameterized output. As one such example, an output-parameterized spooling operator 22 may generate from a first relation 14 a set of two or more temporary relations 80, each comprising a set of records 18 within a particular range 84 of the parameterized spooling for a particular attribute 16 of the relation 14. A first operator 22 may be applied to the two or more temporary relations 80, but instead of producing a single result, may leave the records 18 in the two or more temporary relations 80 for additional processing by a second and possibly additional operators 22, until the temporary relations 80 are eventually scanned into a single intermediate output 72 or query result set 24.

The generation of candidate query plans 92 that may utilize deep partitioning may be achieved in the following manner. For a particular relation set comprising a one relation 14, one or more attributes 16 of the relation 14 may be selected, and for respective attributes 16, a parameterized candidate query plan may be generated that is parameterized based on at least two ranges 84 over the attribute 16. The attributes 16 of the relation 14 may be selected for parameterization based on a set of output parameterizing attributes (e.g., attributes 16 for which partitioning may present an advantage in view of the role of the attribute 16 within the relational query 20), where the set of output parameterizing attributes includes a key attribute of the relation 14 and a predicate of a joining of the relation 14 with another relation 14. Additionally, for relation sets comprising at least two relations 14 that are parameterized on at least two ranges 84 of an attribute 16, a parameterized spooled candidate query plan may be generated by joining the relations 14 in a parameterized manner based on the at least two ranges 84 of the attribute 16, and appending an input spool operator that is parameterized on the at least two ranges 84 over the attribute 16 in order to close the parameterization of the attribute 16. A determination may then occur as to whether the parameterized candidate query plan 92 is within the skyline of the candidate query plans 92 associated with the relation set and the sort order, and if so, the candidate query plan 92 may be stored in the candidate query plan store 136 associated with the relation set, the sort order, and the at least two ranges 84 of the attributes 16 on which the candidate query plan 92 is parameterized. In this manner, the evaluation of candidate query plans 92 may include the consideration of candidate query plans 92 featuring a partitioning of the records 18 of one or more relations 14 that persists across two or more operators 22.

FIGS. 14-15 together present an embodiment of this fourth exemplary technique, illustrated as a code block 210 comprising software instructions that are configured to perform a recursive examination of the relation set in order to select a low-cost query plan 66. The code block 220 of FIG. 14 begins with a "ParamAttributes" function that, for a particular candidate query plan 92, returns the set of attributes 16 upon which the candidate query plan 92 is parameterized. The code block 220 of FIG. 14 also includes a function named "GenerateJoins" that, for a particular pair of candidate query plans 92 and a join algorithm, generates and considers a set of candidate query plans 92, where each candidate query plan 92 is joined using the join algorithm on a parameterized attribute that either appears in only one relation 14, or that appears in both relations 14 but is an attribute 16 upon which the relations 14 are joined. Finally, the code block 220 of FIG. 14 includes an "UpdateMemo" function that is similar to the "UpdateMemo" function of the code block 210 of FIG. 13, but that verifies (as a precondition of storing a candidate query plan 92) that the shallow costs of each query slice 68 of the candidate query plan 92 is below the query slice threshold 62 only for non-parameterized candidate query plans 92. This is because it is difficult to evaluate how many records 18 a parameterized operator 22 may receive from a previous parameterized operator 22 in a deep partition until the candidate query set 92 is actually executed, so the "UpdateMemo" function does not exclude candidate query plans 92 that may, during processing, receive a manageable number of records 18 to process within the query slice threshold 62. Accordingly, this restriction is relaxed for parameterized operators 22 in order to permit full consideration in selecting a query plan 66.

FIG. 15 presents a continued illustration of this embodiment of this fourth exemplary technique, and includes a code block 230 featuring a "SelectPlan" function that resembles the corresponding function in the code block 210 of FIG. 13. However, according to this fourth exemplary technique, the "SelectPlan" function generates parameterized candidate query plans 92 that may feature deep partitioning across several operators 22. For example, when a relation set including a single relation 14 is encountered, the single relation 14 is evaluated (at lines [10]-[13]) to generate one or more parameterized candidate query plans 92 based on "interesting" attributes 16, such as an attribute 16 that comprises a key of the relation 14 or an attribute 16 upon which the relation 14 is joined with another relation 14 in the relational query 20. The parameterized candidate query plan 92 is stored in the skyline of the candidate query plan store 136. Additionally, for a relation set comprising two or more relations 14, the full set of parameterized joins is evaluated by invoking the "GenerateJoins" function illustrated in the code block 220 of FIG. 14, which stores promising parameterized candidate query plans 92 in the candidate query plan store 136. In this manner, the embodiment of this fourth exemplary technique achieves the generation and evaluation of candidate query plans 92 featuring deep partitioning of records 18 over an attribute 16 for two or more operators 22 that may be incorporated by a query plan 66 selected for the execution of the relational query 20. Those of ordinary skill in the art may devise many techniques for generating and selecting efficient query plans 66 for a particular relational query 20 while implementing the techniques presented herein.

A third aspect that may vary among embodiments of these techniques relates to refinements of these techniques to narrow the search space in order to improve the efficiency of the evaluation of the relational query 20. The foregoing exemplary techniques may be invoked to generate candidate query plans 92 having various properties (such as discrete sorting, input and output spooling, parameterized spooling with selected ranges, and deep partitioning.) The evaluation of this rich set of variations may promote the identification of an efficient query plan 66 that is well-suited to the details and subtleties of the original relational query 70. However, as the domain of candidate query plans 92 expands to include many additional variations, the number of candidate query plans 92 that are evaluated may become unmanageable, such that the selection of a query plan 66 for the relational query 20 may become overly resource-intensive. Therefore, techniques may be utilized to reduce the search space and to cull less promising candidate query plans 92 stored in the candidate query plan store 136.

As a first example of this third aspect, in the fourth exemplary technique, the set of attributes 16 that may be evaluated for parameterization of a join over two relations 14 (e.g., the attributes 16 evaluated to achieve a deep partition) may be constrained to a smaller set than is illustrated in the embodiment of FIGS. 14-15. In particular, when considering whether to evaluate parameterized versions of a relation set, it may be advantageous to limit such evaluation to three types of relation sets: those that include a scan operator at the root operator 22; those that comprise a single relation 14; and those that are not already parameterized. Accordingly, the fourth exemplary technique may be altered to evaluate for parameterization only query subplans that have a query subplan type within a restricted query subplan type set that includes nonparameterized query subplans, relation sets having only one relation 14, and query subplans having a scan operator as a root operator.

FIG. 16 presents an embodiment of this variation, comprising a code block 240 featuring a variation of the embodiment of the fourth exemplary technique illustrated in FIGS. 14-15. This code block 240 includes a function named "ValidForDeepPartition" that indicates whether a particular candidate query plan 92 may be validly considered for deep partitioning, based on the query subplan types included in the restricted query subplan type set. This function may then be invoked during the "GenerateJoins" function (e.g., at lines [02]-[03]) to skip the evaluation for parameterization of attributes of a relation 14 for which the associated query subplan is not of a query subplan type that is included in the restricted query subplan type set. In this manner, the evaluation of attributes 16 for parameterization may be significantly limited to avoid unpromising query subplans, thereby improving the efficiency of the search for an efficient query plan 66.

As a second example of this third aspect, instead of broadly searching the search space of valid candidate query plans 92, the search may be limited to candidate query plans 92 that more closely resemble the original relational query 70. For example, some paths within the broad search space may significantly rearrange and supplement the operators 22 of the original relational query 70, but significant rearrangement may infrequently yield efficient candidate query plans 92, or the potential efficiency gain may simply not be worth the expansive evaluation of the search space. Instead, the set of candidate query plans 92 that are generated and evaluated may be restricted to those that resemble the original candidate query plan 92 generated through a plain translation of the original relational query 70. Accordingly, the evaluation of candidate search plans 92 may involve first generating an unconstrained candidate query plan having an unconstrained query slice threshold (e.g., the direct and efficient query plan 66 derived from the relational query 20 in the absence of considerations for generating query slices 68 within the query slice threshold 62), and then identifying in the unconstrained candidate query plan a join pattern that comprises joining a first query subplan and a second query subplan (e.g., the identified pattern of joins among relations 14 in the plainly translated candidate query plan 92.) Alternative candidate query plans 92 may then be generated and evaluated, but only if such candidate query plans 92 include one or more joins among query subplans that correspond to the join of the join pattern identified in the unconstrained candidate query plan. In this manner, the search space for candidate query plans 92 may be significantly restricted to those that resemble the original relational query 70.

As a third example of this third aspect, several of the presented variations of these techniques include a candidate query plan store 136 that is configured to store a set of candidate query plans 92 (such as a skyline) for any particular relation set and sort order. When a new candidate query plan 92 is presented for consideration for inclusion in the candidate query plan store 136, it is compared with the currently existing candidate query plans 92 to determine whether the newly presented candidate query plan 92 is "interesting" (e.g., potentially useful in a distinctive way) over the currently added candidate query plans 92, and may be rejected if it is unlikely to provide a significant advantage in particular circumstances over the currently stored candidate query plans 92. However, additional variations of these techniques may also consider culling the set of currently stored candidate query relations 92 associated with a particular relation set and sort order. For example, when a new candidate query plan 92 is stored in the candidate query plan store 136, other candidate query plans 92 stored in the candidate query plans store 136 may be reevaluated in view of the newly stored candidate query plan 92, and those that now appear unpromising or uninteresting (e.g., candidate query plans 92 having neither a low shallow cost 94 nor a low deep cost 96 among the other candidate query plans 92 associated in the candidate query plan store 136 with the same relation set and sort order) may be removed from the candidate query plan store 136. This culling may promote the conservation of computing resources and improve the efficiency of the search over the search space of candidate query plans 92.

A fourth aspect that may vary among embodiments of these techniques relates to additional features that may be added to improve other embodiments of these techniques. As a first example, a relational query 20 may involve one or more resources of the relational data set 12 on an exclusive basis; e.g., a transactional relational query 20 may involve a precondition that a particular resource (such as a particular value for a record 18, an entire record 18, or an entire relation 14) cannot be altered by any other process during the processing of the relational query 20 or a portion thereof. This exclusivity may be reflected in a query plan 66 for the relational query 20, and may be achieved by an embodiment of these techniques while executing the query plan 66. For example, one such embodiment may, upon selecting a query plan 66 for the relational query 20 and before executing the first query slice 68 of the query plan 66 on the relational data store 12, acquire at least one lock on at least one resource of the relational data store 12 utilized in the query plan 66, and to release the at least one lock on the at least one resource of the relational data store 12 after executing the query slices 68 of the query plan 66 on the relational data store 12. The locking may also be limited to a particular portion of the query plan 66 (e.g., to particularly sensitive operations), which may limit the duration of exclusivity and may reduce gridlock in case other relational queries 20 also interact with the exclusive access. An embodiment of these techniques may also implement other aspects of resource sharing and locking in relation to the processing of a query plan 66, such as negotiating sets of locks on sets of resources in a manner that reduces gridlock and race-condition problems; contending with the unavailability of a lock on a particular resource, in case another relational query 20 has exclusively locked or is nonexclusively using the same resource; and maintaining locks through the execution of the query plan 66, such as while the query plan 66 is not executing while between query slices 68.

As a second example of this fourth aspect, an embodiment of these techniques may monitor various aspects of the execution of a query plan 66, such as the progress of the query plan 66, the duration of respective query slices 68 as compared with the estimated duration, and the amount of resources (such as system memory and exclusive locks) utilized by the query plan 66. In particular, an embodiment may monitor the duration of executing respective query slices 68 (such as the actual query slice cost of executing respective query slices 68) for comparison with the query slice threshold 62 or with the local cost estimated for the query slice 68 to detect query cost estimation inaccuracies in the estimates for one or more query slices 68 and/or violations of the query slice threshold 62. If this occasion arises, the embodiment may react in various ways. As a first example, the embodiment may allow the query slice 68 to complete, but may record the occasion and/or notify an administrator of the relational database server 44 as an indication that the estimation may have been inaccurate. The embodiment might also record a tally of these occasions, and might notify an administrator upon the tally exceeding a tolerance threshold. As a second example, the embodiment may suspend or terminate the query slice 68 (possibly rolling back any changes that have been achieved), and may endeavor to resume the query slice 68 or to execute the query slice 68 again, in case the delay in the completion of the query slice 68 was anomalous, such as due to ordinary fluctuations in system resources (e.g., the query slice 68 might involve the use of a system bus that was momentarily tied up by another relational query 20 or another process.) As a third example, the embodiment may endeavor to reconfigure the query slice 68 (e.g., if the query slice 68 is parameterized over a particular range 84, the embodiment may narrow the range 84 and may add an additional query slice 68 for the revoked portion of the range 84.) As a fourth example, the embodiment may reevaluate the entire query plan 66, such as by selecting another query plan 66 from the candidate query plans 92 that may more closely meet the query slice cost estimates or that may respect the query slice threshold 62. As a fifth example, the embodiment may adjust its cost estimation techniques in view of the estimation inaccuracy. For example, while selecting ranges 84 over an attribute 16 (such as through the binary search technique illustrated in FIGS. 11-12), an embodiment may initially seek to select ranges 84 comprising enough records 18 that a time share allocated for the query slice 68 is fully utilized. However, the full utilization may entail a tradeoff in the tolerable margin of estimation error, and if the margin of error causes chronic overruns of the query slice threshold 62 by the query slices 68 utilizing such ranges 84, the range selection may be adjusted to allow a greater margin of error, even if the query slices 68 less fully utilize the time share as a result. The information about actual query slice execution cost as compared with query slice cost estimations may also be used to train a learning algorithm, such as a neural network, which may then more accurately estimate the query costs while evaluating other relational queries 20.

As a third example of this fourth aspect, an embodiment of these techniques may utilize a variable query slice threshold 62. As a first example, an embodiment of these techniques may utilize different query slice threshold 62 for different relational queries 20; e.g., a higher-priority relational query 20 may be evaluated and executed under a higher query slice threshold 62 than a lower-priority relational query 20. As a second example, the relational database server 44 may utilize different query slice thresholds 62 at different times; e.g., a lower query slice threshold 62 may be utilized during periods of more intensive computing, such as periods of high server load or during business hours, and a higher query slice threshold 62 may be utilized when computing resources are more plentiful or when execution standards are more lax. As a third example, an embodiment of these techniques may permit a relational query 20 to specify a particularly time-sensitive set of operators 22 that are to be executed as quickly as possible (e.g., operators 22 involved in transaction), and may attribute to these operators 22 a higher query slice threshold 62 that may permit a longer time slice for the execution of the time-sensitive query slice 68. As a fourth example, an embodiment of these techniques may permit users 42 to select different query slice thresholds 62 for different relational queries 20; e.g., a relational data service may allow users 42 to select among differently priced query processing priorities, such that users 42 may pay higher rates for the execution of relational queries 20 under higher query slice thresholds, thereby securing longer time slices and higher priorities for the execution of the query slices 68 of their relational queries 20 than for other relational queries 20. Those of ordinary skill in the art may devise such many additional features that may be added to various embodiments of the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 17:
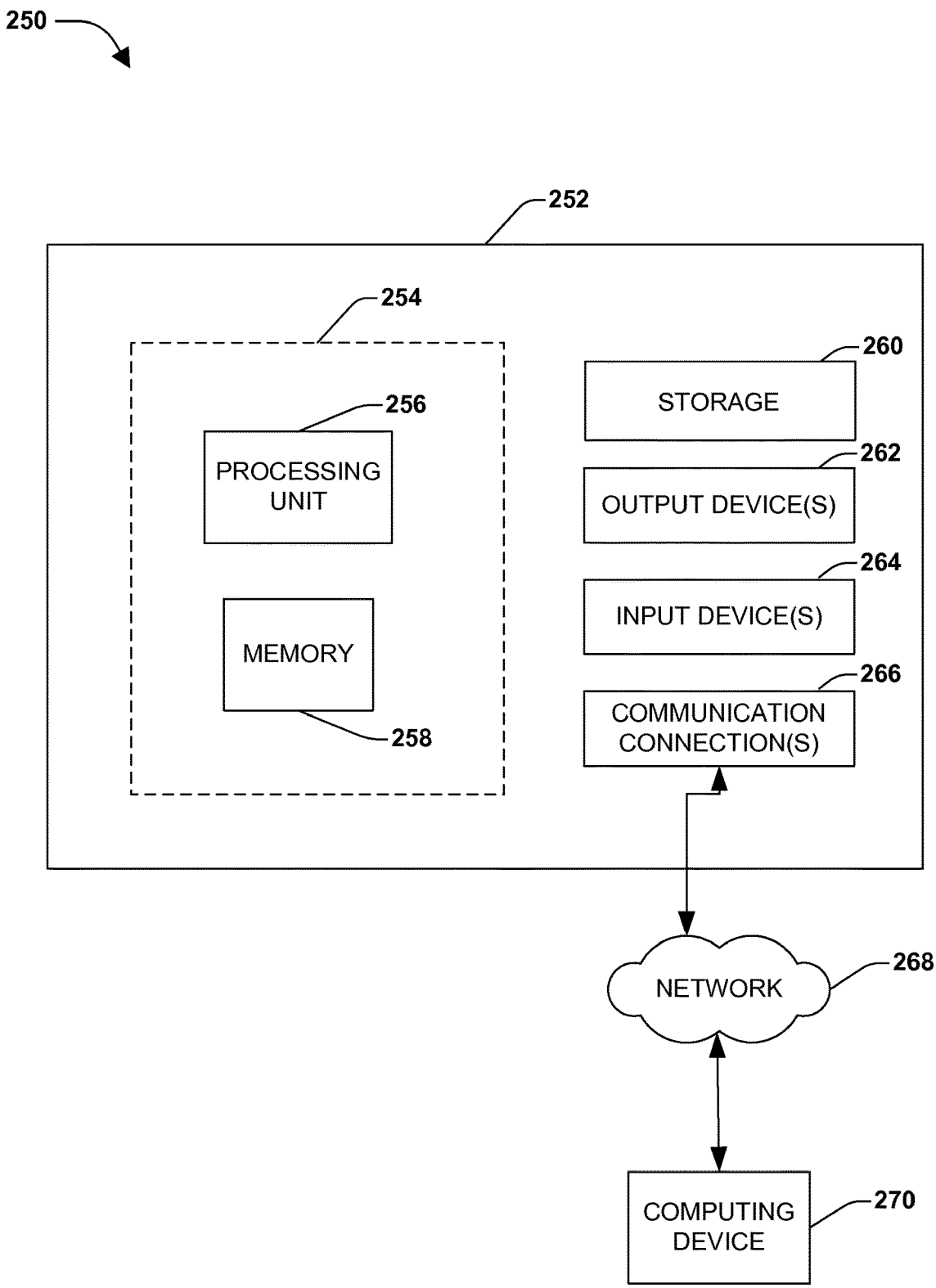
FIG. 17 illustrates an exemplary computing environment wherein one or more of the provisions set forth herein may be implemented.

FIG. 17 and the following discussion provide a brief, general description of a suitable computing environment to implement embodiments of one or more of the provisions set forth herein. The operating environment of FIG. 17 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 17 illustrates an example of a system 250 comprising a computing device 252 configured to implement one or more embodiments provided herein. In one configuration, computing device 252 includes at least one processing unit 256 and memory 258. Depending on the exact configuration and type of computing device, memory 258 may be volatile (such as RAM, for example), non-volatile (such as ROM, flash memory, etc., for example) or some combination of the two. This configuration is illustrated in FIG. 17 by dashed line 254.

In other embodiments, device 252 may include additional features and/or functionality. For example, device 252 may also include additional storage (e.g., removable and/or non-removable) including, but not limited to, magnetic storage, optical storage, and the like. Such additional storage is illustrated in FIG. 17 by storage 260. In one embodiment, computer readable instructions to implement one or more embodiments provided herein may be in storage 260. Storage 260 may also store other computer readable instructions to implement an operating system, an application program, and the like. Computer readable instructions may be loaded in memory 258 for execution by processing unit 256, for example.

The term "computer readable media" as used herein includes computer storage media. Computer storage media includes volatile and nonvolatile, removable and non-removable media implemented in any method or technology for storage of information such as computer readable instructions or other data. Memory 258 and storage 260 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 252. Any such computer storage media may be part of device 252.

Device 252 may also include communication connection(s) 266 that allows device 252 to communicate with other devices. Communication connection(s) 266 may include, but is not limited to, a modem, a Network Interface Card (NIC), an integrated network interface, a radio frequency transmitter/receiver, an infrared port, a USB connection, or other interfaces for connecting computing device 252 to other computing devices. Communication connection(s) 266 may include a wired connection or a wireless connection. Communication connection(s) 266 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 252 may include input device(s) 264 such as keyboard, mouse, pen, voice input device, touch input device, infrared cameras, video input devices, and/or any other input device. Output device(s) 262 such as one or more displays, speakers, printers, and/or any other output device may also be included in device 252. Input device(s) 264 and output device(s) 262 may be connected to device 252 via a wired connection, wireless connection, or any combination thereof. In one embodiment, an input device or an output device from another computing device may be used as input device(s) 264 or output device(s) 262 for computing device 252.

Components of computing device 252 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 252 may be interconnected by a network. For example, memory 258 may be comprised of multiple physical memory units located in different physical locations interconnected by a network.

Those skilled in the art will realize that storage devices utilized to store computer readable instructions may be distributed across a network. For example, a computing device 270 accessible via network 268 may store computer readable instructions to implement one or more embodiments provided herein. Computing device 252 may access computing device 270 and download a part or all of the computer readable instructions for execution. Alternatively, computing device 252 may download pieces of the computer readable instructions, as needed, or some instructions may be executed at computing device 252 and some at computing device 270.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of applying a relational query comprising at least one operator to a relational data set on a device having a processor and defining a query slice threshold, the method comprising:
executing on the processor instructions configured to:
generate a plurality of candidate query plans by partitioning the relational query into at least two query slices between a spool operator storing an intermediate result to storage and a scan operator reading the intermediate result from storage;
from the plurality of candidate query plans, select a candidate query plan comprising query slices respectively having a local cost indicating a resource consumption of the query slice below the query slice threshold indicating a maximum resource consumption of the query slice and a deep cost indicating a resource consumption of the candidate query plan below the deep costs of other candidate query plans from the plurality of candidate query plans; and
execute the query slices of the candidate query plan on the relational data set.

2. The method of claim 1:
the local cost of a query plan associated with a query slice estimated according to a mathematical formula comprising:

$$SC(\rho) = \max_i (LC(\chi(\rho')[r_i])) + SC(\rho'[r_i])$$

wherein:
ρ represents a root operator of the query plan;
SC(ρ) represents an estimated shallow cost of the root operator ρ;
LC(ρ) represents an estimated local cost of the root operator ρ;
ρ'[$r_i$] represents a subplan parameterized over range [$r_i$]; and
χ(ρ'[$r_i$]) represents an input parameterized subplan for subplan ρ' over range [$r_i$]; and
the deep cost of a query plan associated with a query slice estimated according to a mathematical formula comprising:

$$DC(\rho) = \sum_{i=1}^{n} LC(\chi(\rho'[r_i])) + DC(\rho'[r_1]) + \sum_{i=2}^{n} SC(\rho'[r_i])$$

wherein:
Dc(ρ'[$r_i$]) represents an estimated deep cost of a first range over an input parameterized subplan ρ'.

3. The method of claim 1, generating the plurality of candidate query plans for a relation set comprising joining a first relation and a second relation comprising:
evaluating the first relation to identify a first query subplan;
evaluating the second relation to identify a second query subplan; and
generating a candidate query plan by joining the first query subplan and the second query subplan.

4. The method of claim 3:
the device having a candidate query plan store configured to store, associated with a relation set and a sort order, a candidate query plan;
generating a candidate query plan for a relation set comprising:
for a relation set specifying a sort order:
generating a first candidate query plan incorporating the sort order;
generating a second candidate query plan not incorporating the sort order and appending a sort operator; and
comparing the deep cost of the first candidate query plan and the deep cost of the second candidate query plan;
for a relation set comprising one relation, generating a candidate query plan comprising the relation; and
upon generating a candidate query plan:
examining the candidate query plan store for a current candidate query plan associated with the relation set and the sort order; and
if the candidate query plan store does not store a current candidate query plan having a deep cost not exceeding the deep cost of the candidate query plan, storing the candidate query plan in the candidate query plan store associated with the relation set and the sort order.

5. The method of claim 3, generating the plurality of candidate query plans comprising:
upon generating a candidate query plan:
generating a spooled candidate query plan comprising the query plan appending a spool operator and a scan operator, and
comparing the deep cost of the candidate query plan and the deep cost of the spooled candidate query plan.

6. The method of claim 5:
the device having a candidate query plan store configured to store, associated with a relation set and a sort order, a skyline of candidate query plans;
the instructions configured to, upon generating a candidate query plan associated with a relation set and a sort order:
determine whether the candidate query plan is within a skyline of candidate query plans associated with the relation set and the sort order; and
upon determining that the candidate query plan is within the skyline of candidate query plans associated with the relation set and the sort order, store the candidate query plan in the candidate query plan store associated with the relation set and the sort order; and
generating the at least one candidate query plan for a relation set comprising joining a first query subplan and a second query subplan comprising: generating at least one candidate query plan comprising joining a first candidate query plan within the skyline of the first relation and a second candidate query plan within the skyline of the second relation.

7. The method of claim 5, generating the plurality of candidate query plans comprising:
upon generating a candidate query plan, generating from the candidate query plan a parameterized spooled candidate query plan parameterized upon an attribute of a relation utilized by an operator of the candidate query plan by:

identifying at least two ranges over the attribute of the relation;

inserting before the operator an output spool operator parameterized on the at least two ranges over the attribute; and inserting after the operator an input spool operator parameterized on the at least two ranges over the attribute.

8. The method of claim 7, identifying the at least two ranges over the attribute of the relation comprising:

initiating a range set;

initiating an unallocated range as a full range over the attribute;

while a local cost of processing the records of the relation within the unallocated range is greater than the query slice threshold:

identifying an unallocated range portion having a local cost below the query slice threshold;

adding the unallocated range portion to the range set; and removing the unallocated range portion from the unallocated range; and adding the unallocated range to the range set.

9. The method of claim 8, identifying an unallocated range portion comprising: performing a binary search over the unallocated range to identify a range portion having a shallow cost that approaches and does not exceed the query slice threshold.

10. The method of claim 8, comprising: upon failing to partition a range into at least two ranges having a shallow cost not exceeding the query slice threshold:

identifying a secondary attribute, and generating the parameterized spooled candidate query plan that is parameterized upon the secondary attribute.

11. The method of claim 7, generating the plurality of candidate query plans comprising:

for relation sets comprising one relation:

selecting at least one attribute of the relation, and generating at least one parameterized candidate query plan parameterized on at least two ranges over the attribute; and for relation sets comprising at least two relations that are parameterized on at least two range of an attribute, generating a parameterized spooled candidate query plan by:

joining the first relation and the second relation, the join parameterized on the at least two ranges over the attribute, and appending an input spool operator parameterized on the at least two ranges over the attribute.

12. The method of claim 11, the at least one attribute of the relation selected from a set of output parameterizing attributes comprising:

a key attribute of the relation, and a predicate of a joining of the relation with another relation.

13. The method of claim 11:

the device having a candidate query plan store configured to store, associated with a relation set and a sort order, a skyline of candidate query plans, respective candidate query plans associated with at least two ranges of at least zero attributes on which the candidate query plan is parameterized; and the instructions configured to, upon generating a candidate query plan associated with a relation set and a sort order:

determine whether the candidate query plan is within a skyline of candidate query plans associated with the relation set and the sort order; and upon determining that the candidate query plan is within the skyline of candidate query plans associated with the relation set and the sort order, store the candidate query plan in the candidate query plan store associated with the relation set, the sort order, and the at least two ranges of the at least zero attributes on which the candidate query plan is parameterized.

14. The method of claim 13, the instructions configured to, upon storing a candidate query plan in the candidate query plan store associated with the relation set and the sort order, remove from the candidate query plan store candidate query plans not having a low shallow cost among the candidate query plans associated with the relation set and the sort order and not having a low deep cost among the candidate query plans associated with the relation set and the sort order.

15. The method of claim 11, generating the plurality of candidate query plans for a relation set comprising:

selecting the first query subplan having a query subplan type selected from a restricted query subplan typeset comprising:

a non-parameterized query subplan, a relation set having one relation, and a query subplan having a scan operator as a root operator; and selecting the second query subplan having a query subplan type selected from the restricted query subplan type set.

16. The method of claim 11:

the instructions configured to:

generate an unconstrained candidate query plan having an unconstrained query slice threshold, and identify in the unconstrained candidate query plan a join pattern comprising joining a first query subplan and a second query subplan; and generating a candidate query plan comprising a join of the first query subplan and the second query subplan comprising: generating the candidate query plan comprising joining a first query subplan and a second query subplan that corresponds to a join of the join pattern of the unconstrained candidate query plan.

17. The method of claim 1, the instructions configured to:

before executing the query slices on the relational data set, acquire at least one lock on at least one resource of the relational data set utilized in the query plan; and after executing the query slices on the relational data set, release the at least one lock on the at least one resource of the relational data set.

18. The method of claim 1, the instructions configured to:

while executing respective query slices of the candidate query plan:

monitor a query slice cost of executing the query slice, and compare the query slice cost with the shallow cost to detect a query cost estimation inaccuracy; and upon detecting a query cost estimation inaccuracy, reevaluate the candidate query plan.

19. A computer-readable storage device storing instructions that, when executed on a processor of a device, cause the processor to apply a relational query comprising at least one operator to a relational data set respecting a query slice threshold by:

storing, associated with a relation set and a sort order a candidate query plan;

generating a plurality of candidate query plans by partitioning the relational query into at least two query slices between a spool operator storing an intermediate result to storage and a scan operator reading the intermediate result from storage;

from the candidate query plans, selecting a selected candidate query plan comprising query slices respectively having a local cost indicating a resource consumption of the query slice below the query slice threshold indicating a maximum resource consumption of the query slice and a deep cost indicating a resource consumption of the selected candidate query plan below the deep costs of other candidate query plans from the plurality of candidate query plans; and executing the query slices of the selected candidate query plan on the relational data set.

20. A device that applies a relational query comprising at least one operator to a relational data set respecting a query slice threshold, comprising:

a processor; and a memory storing instructions that, when executed on the processor, provide:
 a candidate query plan store;
 a query plan evaluator that:

generates a plurality of candidate query plans by partitioning the relational query into at least two query slices between a spool operator storing an intermediate result to storage and a scan operator reading the intermediate result from storage; and from the plurality of candidate query plans, selects a candidate query plan comprising query slices respectively having a local cost indicating a resource consumption of the query slice below the query slice threshold indicating a maximum resource consumption of the query slice and a deep cost indicating a resource consumption of the candidate query plan below the deep costs of other candidate query plans from the plurality of candidate query plans; and a query plan executor that executes the query slices of the candidate query plan on the relational data set.

\* \* \* \* \*